(12) United States Patent
Yang et al.

(10) Patent No.: US 11,861,782 B2
(45) Date of Patent: Jan. 2, 2024

(54) DATA STRUCTURES, METHODS AND TILING ENGINES FOR STORING TILING INFORMATION IN A GRAPHICS PROCESSING SYSTEM

(71) Applicant: Imagination Technologies Limited, Kings Langley (GB)

(72) Inventors: Xile Yang, Rickmansworth (GB); Robert Brigg, Watford (GB); Michael John Livesley, Edinburgh (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/080,658

(22) Filed: Dec. 13, 2022

(65) Prior Publication Data

US 2023/0111561 A1 Apr. 13, 2023

Related U.S. Application Data

(63) Continuation of application No. 17/172,313, filed on Feb. 10, 2021, now Pat. No. 11,532,115.

(30) Foreign Application Priority Data

Feb. 10, 2020 (GB) .................................... 20017943

(51) Int. Cl.
*G06T 1/20* (2006.01)
*G06T 1/60* (2006.01)
*G06T 15/00* (2011.01)

(52) U.S. Cl.
CPC .............. *G06T 15/005* (2013.01); *G06T 1/20* (2013.01); *G06T 1/60* (2013.01); *G06T 2210/52* (2013.01)

(58) Field of Classification Search
CPC ........... G06T 1/20; G06T 1/60; G06T 15/005; G06T 2210/52
(Continued)

(56) References Cited

U.S. PATENT DOCUMENTS

2009/0066694 A1 3/2009 Redshaw et al.
2011/0304608 A1 12/2011 Yang
(Continued)

FOREIGN PATENT DOCUMENTS

CN 101067869 A 11/2007
CN 102265309 A 11/2011
(Continued)

*Primary Examiner* — Jacinta M Crawford
(74) *Attorney, Agent, or Firm* — Potomac Law Group, PLLC; Vincent M DeLuca

(57) ABSTRACT

Data structures, methods and tiling engines for storing tiling data in memory wherein the tiles are grouped into tile groups and the primitives are grouped into primitive blocks. The methods include, for each tile group: determining, for each tile in the tile group, which primitives of each primitive block intersect that tile; storing in memory a variable length control data block for each primitive block that comprises at least one primitive that intersects at least one tile of the tile group; and storing in memory a control stream comprising a fixed sized primitive block entry for each primitive block that comprises at least one primitive that intersects at least one tile of the tile group, each primitive block entry identifying a location in memory of the control data block for the corresponding primitive block. Each primitive block entry may comprise valid tile information identifying which tiles of the tile group are valid for the corresponding primitive block. A tile is a valid tile for a primitive block if at least one primitive in the primitive block intersects that tile.

20 Claims, 27 Drawing Sheets

(58) Field of Classification Search
USPC .......................................................... 345/530
See application file for complete search history.

(56) References Cited

U.S. PATENT DOCUMENTS

| | | |
|---|---|---|
| 2017/0091897 A1 | 3/2017 | Lee et al. |
| 2017/0316604 A1 | 11/2017 | Yang et al. |
| 2018/0293765 A1 | 10/2018 | Sorgard et al. |

FOREIGN PATENT DOCUMENTS

| | | |
|---|---|---|
| CN | 102292748 A | 12/2011 |
| EP | 3236420 A1 | 10/2017 |
| GB | 2466576 B | 7/2011 |
| GB | 2466569 B | 4/2012 |
| GB | 2549789 A | 11/2017 |

| Control stream Entry | Entry Type | Valid Tile | Other |
| --- | --- | --- | --- |
| | Bits 0-1 | Bits 2-5 | Bits 6-31 |
| Primitive Block Entry 1 | 00 | 0101 | XXXX XXXX |
| Primitive Block Entry 2 | 00 | 0111 | XXXX XXXX |
| Primitive Block Entry 3 | 00 | 0001 | XXXX XXXX |
| Primitive Block Entry 4 | 00 | 0010 | XXXX XXXX |
| Control Data Base Address Entry | 01 | 0000 | XXXX XXXX |
| Primitive Block Entry 5 | 00 | 0100 | XXXX XXXX |
| Primitive Block Entry 6 | 00 | 0010 | XXXX XXXX |
| Termination Entry | 11 | 0000 | XXXX XXXX |

FIG. 7

| Control stream Entry | Entry Type | Valid Tile | Other |
|---|---|---|---|
| | Bits 0-1 | Bits 2-5 | Bits 6-31 |
| Control Data Base Address Entry 1 | 0 1 | 0 0 0 0 | Base Address 1 |
| Primitive Block Entry 1 | 0 0 | 0 1 1 1 | X X X X |
| Primitive Block Entry 2 | 0 0 | 0 0 0 1 | X X X X |
| Primitive Block Entry 3 | 0 0 | 0 0 1 0 | X X X X |
| Control Data Base Address Entry 2 | 0 1 | 0 0 0 0 | Base Address 2 |
| Primitive Block Entry 4 | 0 0 | 0 1 0 0 | X X X X |
| Primitive Block Entry 5 | 0 0 | 0 0 1 0 | X X X X |
| Termination Entry | 1 1 | 0 0 0 0 | X X X X |

FIG. 10

| Control Stream Entry | Entry Type | Valid Tile | Other |
|---|---|---|---|
| | Bits 0-1 | Bits 2-17 | Bits 18-31 |
| High Control Data Base Address Entry 1 | 01 | 0000000000000000 | High Base Address 1 |
| Low Control Data Base Address Entry 1 | 01 | 0000000000000000 | Low Base Address 1 |
| Primitive Block Entry 1 | 00 | 0011100011110000 | XXXX |
| Primitive Block Entry 2 | 00 | 0111000000001111 | XXXX |
| Low Control Data Base Address Entry 2 | 01 | 0000000000000000 | Low Base Address 2 |
| Primitive Block Entry 3 | 00 | 1110000011000000 | XXXX |
| Primitive Block Entry 4 | 00 | 1111111111111110 | XXXX |
| Termination Entry | 11 | 0000000000000000 | XXXX |

FIG. 11

DATA STRUCTURES, METHODS AND TILING ENGINES FOR STORING TILING INFORMATION IN A GRAPHICS PROCESSING SYSTEM

CROSS-REFERENCE TO RELATED APPLICATIONS AND CLAIM OF PRIORITY

This application is a continuation under 35 U.S.C. 120 of application Ser. No. 17/172,313 filed Feb. 10, 2021, now U.S. Pat. No. 11,532,115, which claims foreign priority under 35 U.S.C. 119 from United Kingdom Application No. 2001794.3 filed Feb. 10, 2020.

BACKGROUND

Graphics processing systems are configured to receive graphics data, e.g. from an application (e.g. a game application) running on a computer system, and to render an image from the graphics data to provide a rendering output. For example, an application may generate a 3D model of a scene and output geometry data representing the objects in the scene. In particular, the application may represent each object using one or more primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on a screen.

A graphics processing system may, for example, implement immediate mode rendering (IMR) or tile-based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into screen space coordinates. A per-tile list is then created of the transformed primitives (e.g. triangles) that, at least partially, fall within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) low. Once a colour value has been identified for each pixel in a tile the colour values for the tile are written out to memory (e.g. a frame buffer). Once the entire scene has been rendered (i.e. once colour values have been determined for the pixels of all of the tiles) the scene may be, for example, displayed on a screen.

FIG. 1 illustrates an example TBR graphics processing system 100. The system 100 comprises memory $102_1$, $102_2$, $102_3$, $102_4$, geometry processing logic 104 and rasterization logic 106. Two or more of the memories $102_1$, $102_2$, $102_3$, and $102_4$ may be implemented in the same physical unit of memory.

The geometry processing logic 104 implements the geometry processing phase of TBR. The geometry processing logic 104 comprises transformation logic 108, a primitive block generator 110, and a tiling engine 112. The transformation logic 108 receives geometry data (e.g. vertices, primitives and/or patches) from an application (e.g. a game application) and transforms the geometry data into the rendering space (e.g. screen space). The transformation logic 108 may also perform functions such as clipping and culling to remove geometry data (e.g. primitives or patches) that falls outside of a viewing frustum, and/or apply lighting/attribute processing as is known to those of skill in the art.

The primitive block generator 110 stores the transformed primitives (i.e. the transformed geometry data related thereto) in memory $102_2$ in primitive blocks. A primitive block is a data structure in which one or more primitives (e.g. the transformed geometry data related thereto) are stored together. Storing the primitives in primitive blocks may allow the transformed geometry data for a set of primitives to be stored more efficiently in memory $102_2$. Specifically, the transformed geometry data for a primitive often comprises transformed vertex information for a plurality of vertices where the vertices are shared between (or are common to) multiple primitives. Accordingly, where multiple primitives in the same primitive block share a vertex the data related to that vertex only needs to be stored once in the primitive block.

The transformed primitives may be grouped into primitive blocks using any suitable method or technique. For example, in some cases the transformed primitives may be grouped into primitive blocks based on the order in which the transformed primitives arrive at the primitive block generator 110. In these cases, each primitive block may have a maximum size (e.g. in terms of bits or bytes), a maximum number of primitives which can belong to a primitive block, and/or a maximum number of vertices that can belong to a primitive block and the primitive block generator 110 may be configured to add primitives to a current primitive block until one or more of the maximums is reached.

In other cases, the primitives may be grouped into primitives based on their location in the render space so that spatially similar primitives are in the same primitive block. For example, the rendering space may be divided into macro regions which may encompass multiple tiles (e.g. a 1024× 1024 rendering space that is divided into one thousand twenty-four 32×32 tiles may have sixteen 256×256 macro regions) and the primitive block generator 110 may be configured to maintain a primitive block for each macro region. Then when the primitive block generator 110 receives a primitive it determines which macro region(s) the primitive, at least partially, falls within. If the primitive block generator 110 determines that the primitive falls, at least partially, within only one macro region, then the primitive block generator 110 may place the primitive (i.e. the transformed geometry data related to that primitive) in the primitive block for that macro region. If the primitive block generator 110 determines that the primitive falls within more than one macro region then the primitive block generator 110 may be configured to (i) select one of the macro regions the primitive falls within (e.g. the first one) and place the primitive (i.e. the transformed geometry data related thereto) in the primitive block for the selected macro region; or (ii) place the primitive (i.e. the transformed geometry data related thereto) in the primitive block for each of the macro regions the primitive falls, at least partially, within.

The primitive blocks along with information identifying the location of the primitive blocks in memory are provided to the tiling engine 112. The tiling engine 112 generates, from the transformed geometry data, a list, for each tile, of the transformed primitives that fall, at least partially, within that tile. The list may be referred to as a display list or a transformed display list. In some cases, the transformed display lists may comprise pointers or links to the transformed geometry data (e.g. vertex data) related to the primitives that, at least partially, fall within the tile. For example, FIG. 2 shows an example display list 202 for a tile which comprises a primitive block entry 204, 206 for each primitive block that comprises at least one primitive that falls, at least partially, within the bounds of that tile. Each primitive block entry 204, 206, comprises information 208 identifying the location of the primitive block in memory (e.g. an address of the primitive block in memory) and information 210 identifying which primitives of that primitive block fall, at least partially, within the bounds of the tile. As shown in FIG. 2 the information identifying which primitives of the primitive block fall, at least partially, within a tile may be in the form of a mask that comprises a bit for each primitive in the primitive block that indicates whether or not that primitive falls, at least partially, within the bounds of the tile.

Returning to FIG. 1, the rasterization logic 106 implements the rasterization phase of TBR. Specifically, the rasterization logic 106 renders the primitives in a tile-by-tile manner by fetching the display list for a tile from memory $102_3$ and then fetching the transformed geometry data from memory $102_2$ for the primitives that fall within the tile as indicated by the display list for that tile; and rendering the primitives for that tile based on the transformed geometry data.

In some cases, the rasterization logic 106 may comprise a rasterizer 114, hidden surface removal (HSR) logic 116 and texturing/shading logic 118. In these cases, the rasterizer 114 fetches each of the display lists from memory $102_3$ and for each display list fetches the transformed geometry data from memory $102_2$ for the primitives that fall within a tile as specified by the corresponding display list, and converts each primitive into a set of primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The primitive fragments for a particular tile are then provided to the HSR logic 116 which removes primitive fragments which are hidden (e.g. hidden by other primitive fragments) by performing depth testing on the primitive fragments. The remaining fragments (after hidden surface removal) are then passed to the texturing/shading logic 118 which performs texturing and/or shading on the primitive fragments to determine pixel values of a rendered image. The rendered pixel values for a tile are then stored in memory $102_4$ (e.g. frame buffer).

The rasterization logic 106 processes each of the tiles and when the whole image has been rendered and stored in the memory $102_4$ (e.g. frame buffer) the image can be output from the graphics processing system 100 and used in any suitable manner, for example, displayed on a display, stored in memory, or transmitted to another device, etc. The TBR graphics processing system 100 shown in FIG. 1 is a "deferred" rendering system in the sense that fragments are processed by the HSR logic 116 before being processed by the texturing/shading logic 118. In other examples, the graphics processing system might not be a deferred rendering system in which case texturing/shading would be applied to fragments before HSR is applied to those fragments.

Although the geometry processing logic is shown in the figures as being separate to the rasterization logic, in some implementations the geometry processing logic and the rasterization logic may share some resources. For example, the graphics processing system could use a unified shading approach wherein the same physical execution units can be used to execute instructions for use in the geometry processing phase (e.g. to perform vertex processing) and to execute instructions for use in the rasterization phase (e.g. to perform fragment processing).

The embodiments described below are provided by way of example only and are not limiting of implementations which solve any or all of the disadvantages of known methods and systems for tiling primitives in a graphics processing system.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are data structures, methods and tiling engines for storing tiling data in memory wherein the tiles are grouped into tile groups and the primitives are grouped into primitive blocks. The methods include, for each tile group: determining, for each tile in the tile group, which primitives of each primitive block intersect that tile; storing in memory a variable length control data block for each primitive block that comprises at least one primitive that intersects at least one tile of the tile group; and storing in memory a control stream comprising a fixed sized primitive block entry for each primitive block that comprises at least one primitive that intersects at least one tile of the tile group, each primitive block entry identifying a location in memory of the control data block for that primitive block. Each primitive block may comprise valid tile information identifying which tiles of the tile group are valid for the primitive block. A tile is a valid tile for a primitive block if at least one primitive in the primitive block intersects that tile.

A first aspect provides a method of tiling primitives in a tile based graphics processing system in which a rendering space is divided into a plurality of tiles, the plurality of tiles being grouped into a plurality of tile groups each comprising at least two tiles, the method comprising, for a tile group:

determining, for each tile of the tile group, which primitives of each of a plurality of primitive blocks intersect that tile, each primitive block comprising at least one primitive; storing in memory a variable length control data block for each primitive block that comprises at least one primitive that intersects at least one tile of the tile group; and storing in memory a control stream, the control stream comprising a fixed sized primitive block entry for each primitive block that comprises at least one primitive that intersects at least one tile of the tile group, each primitive block entry identifying a location in memory of the control data block for the corresponding primitive block.

Each primitive block entry may comprise valid tile information identifying which tiles of the tile group are valid for the corresponding primitive block, a tile may be a valid tile for a primitive block if at least one primitive in the primitive block intersects that tile.

The valid tile information may comprise a valid tile mask which comprises a bit for each tile in the tile group which indicates whether that tile is a valid tile for the primitive block.

The control stream may comprise at least one other type of entry, each of the at least one other type of entry may comprise valid tile information that indicates that none of the tiles of the tile group are valid tiles.

Each control data block may comprise information identifying which primitives of the corresponding primitive block intersect each tile.

At least one control data block may comprise at least one primitive mask which comprises a bit for each primitive in the corresponding primitive block that identifies whether or not that primitive intersects a set of one or more tiles of the tile group.

At least one control data block may comprise a primitive mask for each tile of the tile group that intersects at least one primitive in the corresponding primitive block, each primitive mask may comprise a bit for each primitive in the corresponding primitive block that identifies whether or not that primitive intersects the corresponding tile.

Each control data block may comprise information identifying an address of the corresponding primitive block in memory.

Each control data block may comprise a primitive block header that indicates: whether one or more of the tiles of the tile group intersect the same primitives of the corresponding primitive block and/or whether one or more of the tiles of the tile group intersect all of the primitives in the corresponding primitive block.

Each primitive block entry may comprise a data pointer that identifies the location in memory of the corresponding control data block; the control stream may comprise at least one control data base address entry which specifies at least a portion of a control data base address; and an address of a control data block in memory may be generated from a combination of the control data base address and the data pointer of the corresponding primitive block entry.

Each data pointer may comprise an offset into a portion of memory identified by the control data base address.

Each control data base address entry may specify a complete control data base address.

Each control data base address entry may specify only a portion of a complete control data base address.

The control stream may comprise a first control data base address entry that specifies a first portion of the control data base address and a second control data base address entry that specifies a second portion of the control data base address.

Each primitive block entry may comprise a primitive block header that comprises information that describes the corresponding primitive block and/or the corresponding control data block.

Storing the control stream in memory may comprises dividing the control stream entries into a plurality of control stream blocks; wherein a last entry in each control stream block, other than the last control stream block, may be a link entry which identifies a location of a next control stream block in memory.

The control stream may further comprise a termination entry which identifies an end of the control stream, the termination entry may be a last entry in the control stream.

Each primitive block entry may be 32-bits.

Each tile group may comprise an N×M block of tiles in the render space wherein N and M are integers greater than or equal to 1. N and M may be equal to 2.

A second aspect provides a tiling engine for use in a graphics processing system for tiling primitives into tiles in a tile group of a rendering space, the tiling engine comprising: tiling logic configured to determine, for each tile of the tile group, which primitives of each of a plurality of primitive blocks intersect that tile, each primitive block comprising at least one primitive; a control data block generator configured to store in memory a variable length control data block for each primitive block that comprises at least one primitive that intersects at least one tile of the tile group; and a control stream generator configured to store in memory a control stream, the control stream comprising a fixed sized primitive block entry for each primitive block that comprises at least one primitive that intersects at least one tile of the tile group, each primitive block entry identifying a location in memory of the control data block for the corresponding primitive block.

A third aspect provides a method of decoding a control stream for a tile group comprising at least two tiles of a rendering space, the method comprising: receiving a control stream for the tile group, the control stream comprising one or more fixed length primitive block entries, each primitive block entry identifying a location in memory of a control data block for the corresponding primitive block; for at least one of the primitive block entries: (a) determining whether a current tile of the tile group is valid for the corresponding primitive block, a tile being a valid tile for a primitive block if at least one primitive in the primitive block intersects that tile; (b) in response to determining that the current tile is valid for the corresponding primitive block, retrieving the corresponding control data block from the identified location in memory; (c) identifying, from the retrieved control data block, an address of the primitive block in memory and the primitives of that primitive block relevant for rendering the current tile; and (d) outputting information identifying the address of the primitive block in memory and the primitives of that primitive block relevant for rendering the current tile.

Each primitive block entry may comprise valid tile information identifying which tiles of the tile group are valid for the corresponding primitive block; and the method may further comprise for a group of entries of the control stream: selecting a portion of the valid tile information for each entry of the group of entries corresponding to the current tile; performing an operation on the selected portions to determine whether the current tile is valid for any of the primitive block entries in the group of entries; and only performing (a)-(d) for the primitive block entries in the group of entries if a result of the operation indicates that the current tile is valid for at least one of the primitive block entries in the group of entries.

The valid tile information for each entry may comprise a valid mask with a bit for each tile of the tile group that indicates whether that tile is valid for the entry; the selected portion of the valid tile information for each entry may be the bit of the valid tile mask that corresponds to the current tile; and the operation that is performed on the selected portions may be an OR operation.

A fourth aspect provides a control stream decoder for decoding a control stream for a tile group comprising at least two tiles of a rendering space, the control stream decoder comprising: a fetch module configured to fetch a control stream for the tile group from memory, the control stream comprising one or more fixed length primitive block entries, each primitive block entry identifying a location in memory of a control data block for the corresponding primitive block; a primitive block entry analyser which is configured to, for at least one of the one or more primitive block entries: determine whether a current tile of the tile group is valid for the corresponding primitive block, a tile being a valid tile for a primitive block if at least one primitive in the primitive block intersects that tile; in response to determining that the current tile is a valid tile for the corresponding primitive block, retrieve the corresponding control data bock from the identified location in memory; identify, from the retrieved control data block, an address of the primitive block in memory and the primitives of that primitive block relevant for rendering the current tile; and output information identifying the address of the primitive block in memory and the primitives of that primitive block relevant for rendering the current tile.

A fifth aspect provides a method of tiling primitives in a tile based graphics processing system in which a rendering space is divided into a plurality of tiles, the plurality of tiles being grouped into a plurality of tile groups each comprising at least two tiles, the method comprising, for a tile group: determining, for each tile of the tile group, which primitives of each of a plurality of primitive blocks intersect that tile, each primitive block comprising at least one primitive; storing in memory a variable length control data block for each primitive block that comprises at least one primitive that intersects at least one tile of the tile group; and storing in memory a control stream, the control stream comprising a fixed sized primitive block entry for each primitive block that comprises at least one primitive that intersects at least one tile of the tile group, each primitive block entry comprising (i) valid tile information identifying which tiles of the tile group are valid for the primitive block, and (ii) a data pointer identifying a location in memory of the control data block for that primitive block, a tile being a valid tile for a primitive block if at least one primitive in the primitive block intersects that tile.

A sixth aspect provides a tiling engine for use in a graphics processing system for tiling primitives into tiles in a tile group of a rendering space, the tiling engine comprising: tiling logic configured to determine, for each tile of the tile group, which primitives of each of a plurality of primitive blocks intersect that tile, each primitive block comprising at least one primitive; a control data generator configured to store in memory a variable length control data block for each primitive block that comprises at least one primitive that intersects at least one tile of the tile group; and a control stream generator configured to store in memory a control stream, the control stream comprising a fixed sized primitive block entry for each primitive block that comprises at least one primitive that intersects at least one tile of the tile group, each primitive block entry comprising (i) valid tile information identifying which tiles of the tile group are valid for the primitive block, and (ii) a data pointer identifying a location in memory of the control data block for that primitive block, a tile being a valid tile for a primitive block if at least one primitive in the primitive block intersects that tile.

A seventh aspect provides a method of decoding a control stream for a tile group comprising at least two tiles of a rendering space to generate a display list for a current tile in the tile group, the method comprises: receiving a control stream for the tile group, the control stream comprising one or more fixed length primitive block entries, each primitive block entry comprising (i) valid tile information identifying which tiles of the tile group are valid for the primitive block, and (ii) a data pointer identifying a location in memory of a control data block for that primitive block, a tile being a valid tile for a primitive block if at least one primitive in the primitive block intersects that tile; for at least one of the primitive block entries: determining, from the valid tile information whether the current tile is valid for the corresponding primitive block; in response to determining that the current tile is valid for the corresponding primitive block, identifying, from the data pointer, an address of the corresponding control data block in memory; retrieving the corresponding control data block from the identified address in memory; identifying, from the retrieved control data block, an address of the primitive block in memory and the primitives of that primitive block relevant for rendering the current tile; and outputting information identifying the address of the primitive block in memory and the primitives of that primitive block relevant for rendering the current tile.

An eighth aspect provides a control stream decoder for decoding a control stream for a tile group comprising at least two tiles of a rendering space to generate a display list for a current tile in the tile group, the control stream decoder comprising: fetch module configured to fetch a control stream for the tile group from memory, the control stream comprising one or more fixed length primitive block entries, each primitive block entry comprising (i) valid tile information identifying which tiles of the tile group are valid for the primitive block, and (ii) a data pointer identifying a location in memory of a control data block for that primitive block, a tile being a valid tile for a primitive block if at least one primitive in the primitive block intersects that tile; a primitive block entry analyser which is configured to, for at least one of the primitive block entries: determine, from the valid tile information whether the current tile is valid for the corresponding primitive block; in response to determining that the current tile is valid for the corresponding primitive block, identify, from the data pointer, an address of the corresponding control data block in memory; retrieve the corresponding control data block from the identified address in memory; identify, from the retrieved control data block, an address of the primitive block in memory and the primitives of that primitive block relevant for rendering the current tile; and output information identifying the address of the primitive block in memory and the primitives of that primitive block relevant for rendering the current tile.

The tiling engines, control stream decoders and graphics processing systems described herein may be embodied in hardware on an integrated circuit. There may be provided a method of manufacturing, at an integrated circuit manufacturing system, an integrated circuit embodying a tiling engine, a control stream decoder and/or a graphics processing system described herein. There may be provided an integrated circuit definition dataset that, when processed in an integrated circuit manufacturing system, configures the system to manufacture an integrated circuit embodying a tiling engine, a control stream decoder or a graphics processing system described herein. There may be provided a non-transitory computer readable storage medium having stored thereon a computer readable description of a tiling engine, a control stream decoder or a graphics processing system described herein that, when processed in an integrated circuit manufacturing system, causes the integrated circuit manufacturing system to manufacture an integrated circuit embodying the tiling engine, the control stream decoder or the graphics processing system.

There may be provided an integrated circuit manufacturing system comprising: a non-transitory computer readable storage medium having stored thereon a computer readable description of a tiling engine, a control stream decoder or a graphics processing system described herein; a layout processing system configured to process the computer readable description so as to generate a circuit layout description of an integrated circuit embodying the tiling engine, the control stream decoder or the graphics processing system; and an integrated circuit generation system configured to manufacture an integrated circuit embodying the tiling engine, the control stream decoder or the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 7 is a schematic diagram illustrating an example set of control stream entries wherein each entry comprises a valid information field;

FIG. 10 is a schematic diagram illustrating a first example set of control stream entries which comprise a plurality of control data base address entries;

FIG. 11 is a schematic diagram illustrating a second example set of control stream entries which comprise a plurality of control data base address entries;

Figure 1:
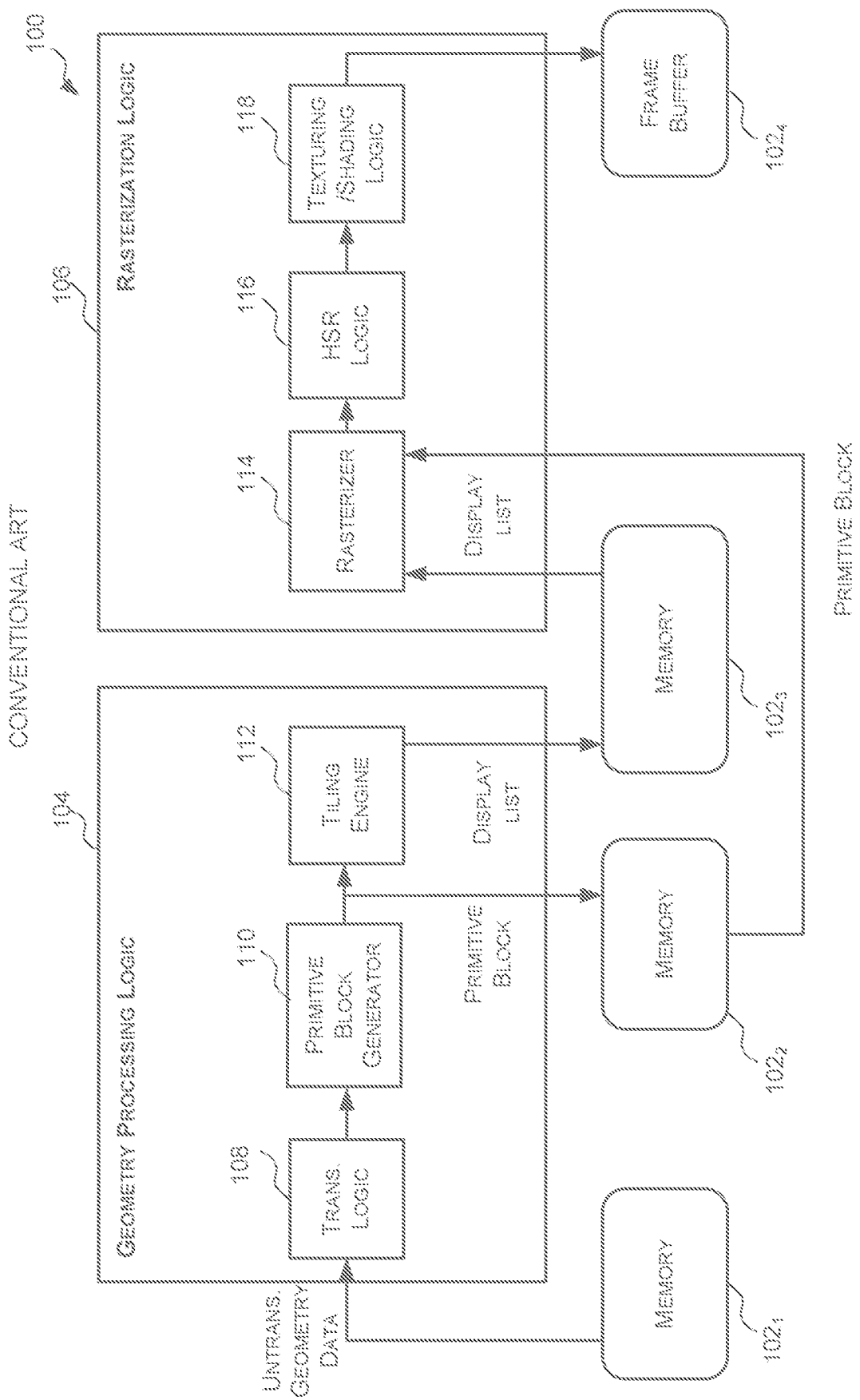
FIG. 1 is a block diagram of an example tile-based rendering graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, when transformed primitives (e.g. the transformed geometry data related thereto) are stored in primitive blocks the display list for a tile may comprise an entry for each primitive block that comprises at least one primitive that falls, at least partially, within the bounds of that tile. Since a primitive block may comprise primitives that fall, at least partially, within the bounds of multiple tiles, there may be a primitive block entry in multiple tiles for the same primitive block. To reduce this repetition of primitive block data the tiles may be divided into group of N×M tiles, wherein N and M are integers greater than or equal to 1, and a per tile group control stream is generated that identifies the primitive blocks (and the primitives thereof) that are relevant to each tile in the group.

For example, UK Patent No. 2466576 describes storing for each group of tiles a control stream that comprises a primitive block entry for each primitive block that comprises at least one primitive that falls, at least partially, within the bound of at least one tile in the group. Each primitive block entry comprises: (i) information identifying which tiles are valid for that primitive block, (ii) information identifying the location of the primitive block in memory, and (iii) for each valid tile, information identifying the primitives of that primitive block that fall, at least partially, within the bounds of that tile. A tile is said to be valid for a primitive block if there is at least one primitive in the primitive block that falls, at least partially, within the bounds of that tile. A primitive that falls, at least partially, within the bound of a tile may alternatively be described as a primitive that intersects that tile.

Figure 3:
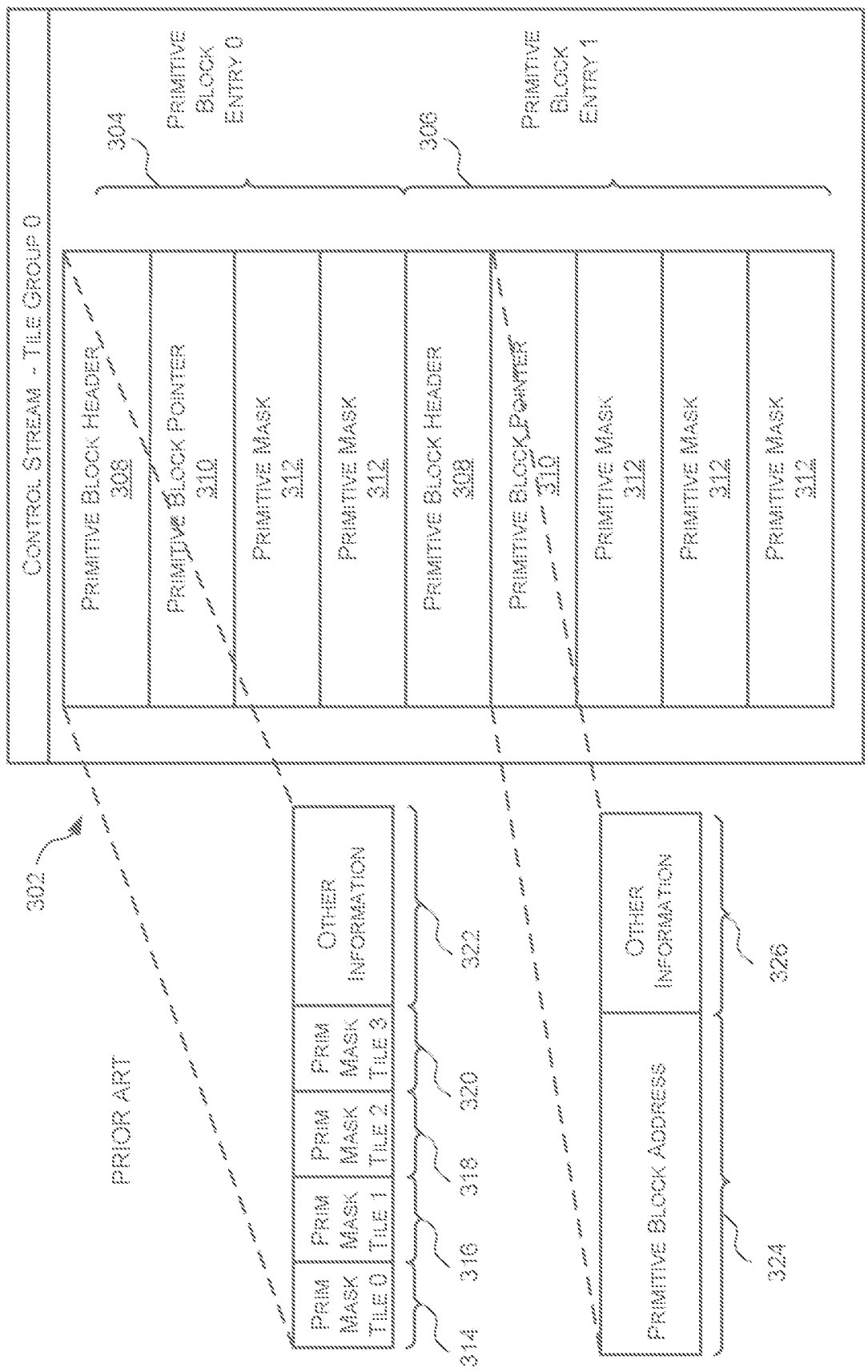
FIG. 3 is a schematic diagram illustrating an example control stream for a group of tiles.

FIG. 3 shows an example of the control stream 302 of UK Patent No. 2466576 for a tile group comprising four tiles. The control stream 302 comprises a primitive block entry 304, 306 for each primitive block that is valid for at least one tile in the tile group. Each primitive block entry 304, 306 comprises a primitive block header 308 and a primitive block pointer 310. A primitive block entry 304, 306 may optionally comprise primitive mask data 312. The primitive block header 308 comprises information identifying which tiles in the tile group are valid for the primitive block. For example, as shown in FIG. 3 the primitive block header 308 may comprise a primitive mask format field 314, 316, 318 and 320 for each tile in the tile group that indicates whether or not the tile is valid for the primitive block. For example each primitive mask format field 314, 316, 318, 320 may comprise two bits and '00' may indicate that the tile is invalid for the primitive block; '01' may indicate that the tile has a full primitive mask (i.e. all primitives in the primitive block are valid for the tile); '10' may indicate that the primitive mask is compressed; and '11' may indicate that the primitive mask is uncompressed. The primitive block header 308 may also comprise other information 322 such as, but not limited to, the number of vertices in the primitive block, whether or not all the tiles in the tile group are valid and have the full primitive mask (i.e. all the primitives in the primitive block are valid for the tile), and whether or not all of the tiles have the same primitive mask.

The primitive block pointer 310 comprises the address of the primitive block in memory 324. In some cases, the primitive block pointer 310 may also comprise other information 326, such as, but not limited to, the number of primitives in the primitive block.

The primitive mask data 312 comprises one or more primitive masks that identify the primitives of the primitive block that fall, at least partially, within the bounds of each of the valid tiles. Each primitive mask may comprise a bit for each primitive in the primitive block that indicates whether that primitive falls, at least partially, within the bounds of the corresponding tile(s). In some cases (e.g. when each valid tile has a different primitive mask), the primitive mask data 312 may comprise a primitive mask for each valid tile. In other cases (e.g. when all the valid tiles have the same primitive mask), the primitive mask data 312 may comprise only one mask which applies to all of the valid tiles. Each primitive mask may be in a compressed or uncompressed form.

One of the issues with this control stream structure described in UK Patent No. 2466576 is that the primitive mask data is variable in length. This is because the size of the primitive mask data depends on the number of valid tiles, the number of primitives in the primitive block, and whether or not the primitive masks are compressed. As the primitive mask data is variable in length so are the primitive block entries. This means that for the rasterization logic to determine which primitive blocks are relevant to a tile the rasterization logic has to process each primitive block entry in the control stream. Specifically, the rasterization logic has to process each primitive block entry to determine (i) whether the corresponding primitive block is relevant to the tile being processed; and (ii) where the next primitive block entry begins. Where there are large gaps between relevant primitive block entries in the control stream this many affect the performance of the graphics processing system. For example, if there are 2000 primitive block entries and a tile is valid only for the first and last primitive block entries there will be significant gap between when the data related to the first primitive block entry is output and when the data related to the last primitive block entry is output.

Accordingly, described herein is a tile group control structure, and methods and tiling engines for generating such a control structure, in which the variable length fields or portions of the primitive block entries are removed therefrom and stored separately so that the primitive block entries have a fixed length. Specifically, the tile group control structures described herein comprise a control stream that comprises a fixed length primitive block entry for each primitive block that comprises at least one primitive that falls, at least partially, within the bounds of at least one tile in the tile group. Like, the primitive block entries of UK Patent No. 2466576 each primitive block entry comprises information (e.g. a valid tile mask) identifying the valid tiles in the tile group for that primitive block. However, instead of the variable length control data (e.g. primitive masks) for a primitive block being included in the primitive block entry, the variable length control data is stored elsewhere in memory (e.g. in another page) and the primitive block entry comprises a pointer or link to the variable length control data.

The fixed length primitive block entries allow the rasterization logic to quickly identify the information (e.g. valid tile mask) identifying the valid tiles for each primitive block without having to process each primitive block entry. Specifically, the rasterization logic no longer has to process each primitive block entry to identify where the next primitive block entry starts. In contrast, the rasterization logic can quickly pull out the information (e.g. valid tile mask) identifying the valid tiles to determine which primitive blocks are relevant to a particular tile. This allows the rasterization logic to quick skip over primitive block entries that are not relevant to a particular tile. Testing has shown this can significantly decrease the time for the rasterization logic to skip over invalid entries (i.e. entries not valid to a tile). Specifically, testing has shown that this can, in some cases, double the rate at which the rasterization logic can skip invalid primitive block entries. Furthermore, the rasterization logic only has to read the variable length control data for a primitive block from memory if that primitive block is relevant to the tile.

Figure 4:
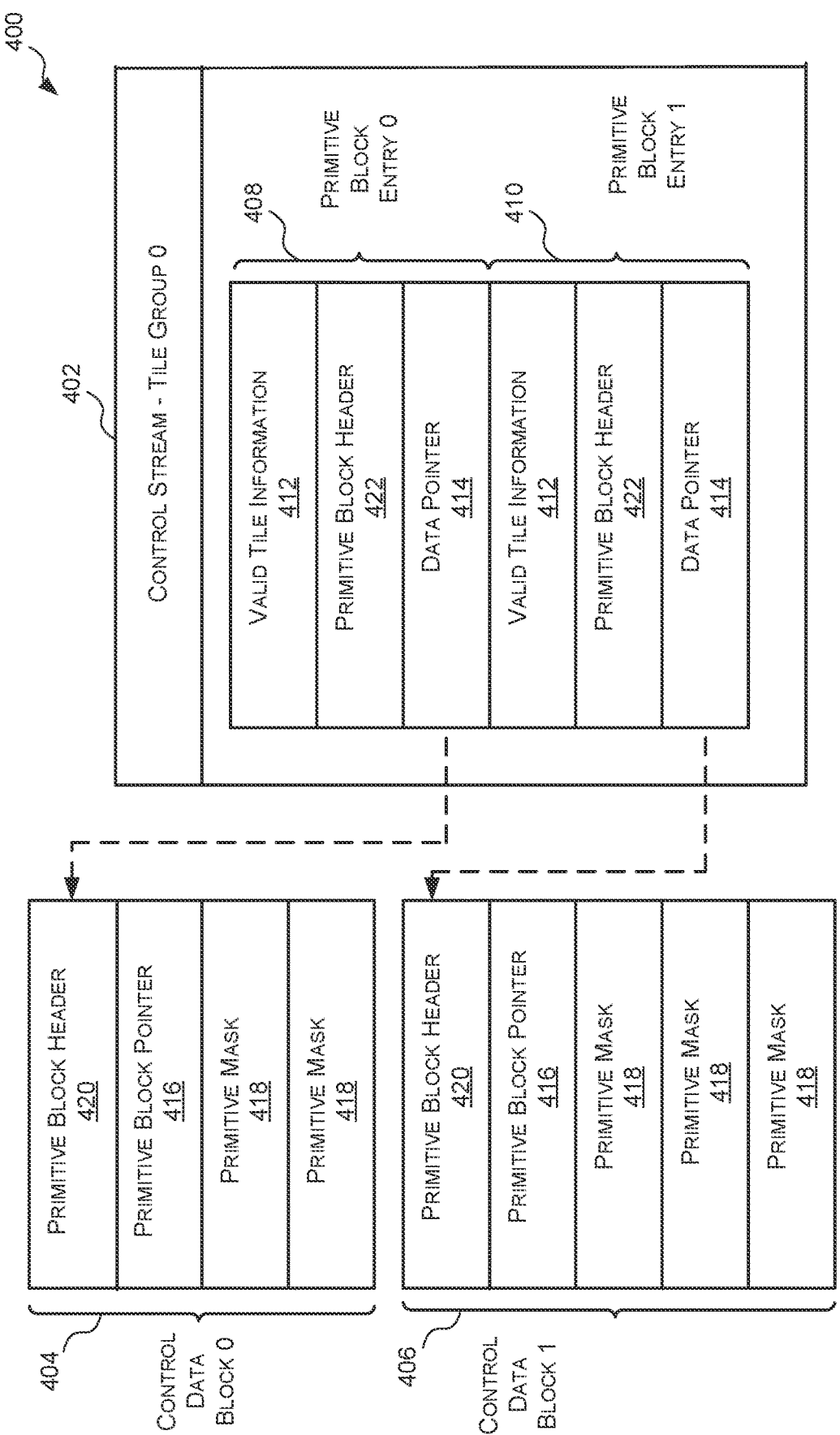
FIG. 4 is a schematic diagram illustrating a first example control structure for a group of tiles comprising a control stream with fixed-sized entries and a plurality of control data blocks linked to the control stream.

Reference is now made to FIG. 4 which illustrates a first example tile group control structure 400 which comprises a control stream 402 that includes one or more fixed length control entries which identify primitive blocks that are relevant to the tile group, and a control data block 404, 406 for each relevant primitive block that is stored separately from the control stream 402.

Specifically, the control stream 402 comprises a primitive block entry 408, 410 for each primitive block that comprises at least one primitive that falls, at least partially, within the bounds of at least one tile in the tile group. In the example of FIG. 4 the control stream 402 comprises two primitive block entries 408, 410 indicating that there are two primitive blocks that comprise primitives that fall, at least partially, within the bounds of at least one tile in the group. However, it will be evident to a person of skill in the art that this is an example only and that there may be any number of primitive block entries.

Each primitive block entry 408, 410 comprises valid tile information 412 which indicates which tiles in the tile group are valid for the corresponding primitive block, and a data pointer 414 that identifies the location of the corresponding control data block in memory. Each primitive block entry 408, 410 may also, optionally, include a primitive block header 422 which comprises information about the primitive block and/or its relationship to the tiles of the tile group.

The valid tile information 412 may comprise a valid tile mask that comprises a bit for each tile in the tile group that indicates whether or not that tile is valid for the primitive block. For example, the valid tile mask for a tile group comprising four tiles may comprise four bits. In some cases, a '0' may indicate that the tile is not valid for the primitive block and a '1' may indicate that the tile is valid for the primitive block. However, it will be evident to a person of skill in the art that this is an example only and that a '0' may indicate the corresponding tile is valid. As described above, a tile is valid for a primitive block if the primitive block comprises at least one primitive that falls, at least partially, within the bounds of at least one tile in the tile group.

Figure 5:
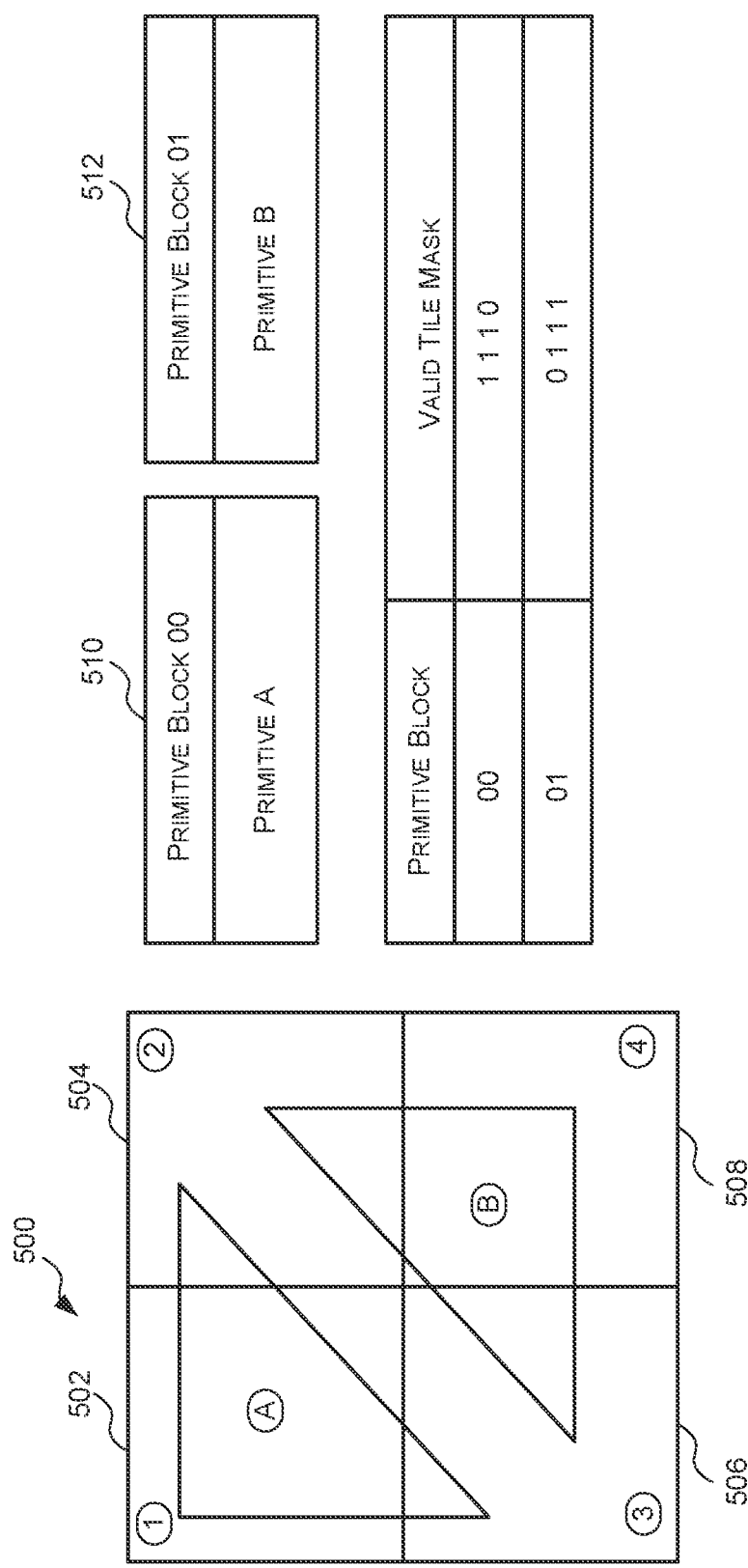
FIG. 5 is schematic diagram illustrating example valid tile masks for an example 2×2 tile group.

Reference is now made to FIG. 5 which illustrates example valid tile masks for an example set of primitive blocks for a tile group 500 comprising four tiles (i.e. a tile group comprising a 2×2 block of tiles): a first tile 502, a second tile 504, a third tile 506 and a fourth tile 508. In this example, there are two primitives: primitive A and primitive B which fall within the bounds of the tiles in the tile group as shown in FIG. 5. Primitive A forms part of a first primitive block 510, and primitive B forms part of a second primitive block 512. As primitive A falls, at least partially, within the bounds of the first, second and third tiles 502, 504, 506 the valid tile mask for the first primitive block 510 may be '1 1 1 0' wherein a '1' indicates that the tile is valid for the primitive block. Similarly, as primitive B falls, at least partially, within the bounds of the second, third and fourth tiles 504, 506 and 508 the valid tile mask for the second primitive block 512 may be '0 1 1 1'. It will be evident to a person of skill in the art that this is a simple example where each primitive block comprises only a single primitive, however, in other examples primitive blocks may comprise a plurality of primitives.

Returning to FIG. 4, as the control data for a primitive block is stored separately from the primitive block entry for that primitive block, the data pointer 414 comprises information identifying the location of the corresponding control data block in memory. In some cases, the data pointer 414 may comprise the address of the control data block in memory. In other cases, as described in more detail below, the data pointer 414 may comprise an offset, and the address of the tiling data for a particular primitive block may be determined from the offset and a control data base address.

The control data 404, 406 for a primitive block is defined herein as data that allows the primitives (e.g. the transformed geometry data related thereto) in the primitive block that are relevant to the rendering of a particular tile in the tile group to be obtained. The control data 404, 406 for a primitive block may comprise a primitive block pointer 416 which identifies the location of the primitive block in memory. In some cases, the primitive block pointer 416 may comprise an address in memory at which the primitive block is stored.

The control data 404, 406 may also optionally, comprise information 418 identifying the primitives of the corresponding primitive block that are relevant to each of the valid tiles. The information 418 identifying the primitives of the corresponding primitive block that are relevant to each of the valid tiles may comprises one or more primitive masks. In some cases, there may be one primitive mask for each valid tile that identifies the primitives in the primitive block that are relevant to that tile. In other cases, there may be a primitive mask that is shared between one or more tiles. For example, where the valid tiles of the tile group all have the same primitive mask then only a single copy of the primitive mask may be stored in the control data block 404, 406 and the control data block 404, 406 may comprise information (e.g. in a primitive block header as described below) indicating that all of the valid tiles have the same primitive mask. In some cases, no primitive mask may be stored in the control data block for a primitive block. For example, in some cases if all of the primitives in the primitive block are relevant to all of the valid tiles, which may be referred to herein as the valid tiles having a full primitive mask, then the control data block 404, 406 may simply comprise information (e.g. in a primitive block header as described below) indicating that each of the valid tiles have a full primitive mask.

Each primitive mask may comprise a bit for each primitive in the primitive block that indicates whether that primitive is relevant for rendering the corresponding tile(s) (i.e. whether that primitive falls, at least partially, within the bounds of the corresponding tile(s)). For example, if there are fifty primitives in the primitive block then the primitive mask may comprise fifty bits. In some cases a '1' may indicate that the primitive falls, at least partially, within the bounds of the corresponding tile(s) and a '0' may indicate that the primitive does not fall, at least partially, within the bounds of the corresponding tile(s). However, it will be evident to a person of skill in the art that this is an example only and that in other cases a '0' may indicate that a primitive is relevant to the corresponding tile(s) and a '1' may indicate that the primitive is not relevant to the corresponding tile(s). The primitive mask(s) may be stored in the control data block in compressed or uncompressed form. Any suitable compression technique or algorithm may be used to compress a primitive mask.

The primitive block entries 408, 410 and/or control data block 404, 406 may optionally comprise a primitive block header 420 or 422 that provides additional information about the primitive block and/or the associated control data. Either or both of the primitive block headers 420, 422 may comprise one or more of the following:

Full Mask Information—(e.g. a bit) that indicates that all of the tiles in the tile group have the full primitive mask and thus no primitive masks are stored in the control data block Primitive Counter Information—(e.g. seven bits for up to 128 primitives) that indicates the number of primitives in the primitive blocks. This can help the rasterization logic determine the size of a primitive mask stored in the control data block.

Same Mask Information—(e.g. a bit) that indicates all the tiles in the tile group have the same primitive mask, so only one primitive mask is stored in the control data block Primitive Mask Format Information (per tile in the tile group)—(e.g. two bits per tile for up to 4 primitive mask formats) that indicates the format of the primitive mask for that tile. For example, where the Primitive Mask Format Information comprises two bits per tile, '01' may indicate that the tile has a full primitive mask and thus a primitive mask for the tile is not included in the control data block, '10' may indicate that the primitive mask for the tile is stored in the control data block in compressed form, and '11' may indicate that the primitive mask for the tile is stored in the control data block in uncompressed form.

Primitive Mask Start Information (per tile in the tile group)—that indicates the starting location of the primitive mask in the control data block for that tile.

It will be evident to a person of skill in the art that this is only an example list of information that may be included in a primitive block header and other example primitive block headers may comprise additional and/or different information.

The information that is included in the primitive block header of a primitive block entry 408, 410 may be based on (i) the size or length of the primitive block entry; and (ii) the number of tiles in the tile group. Specifically, the number of tiles in the tile group determines the number of bits required for the valid tile mask and thus dictates how many of the remaining bits are available for the data pointer information and the primitive block header. In one example, each primitive block entry 408, 410 may comprise a primitive block header 422 that comprises Full Mask Information and/or Same Mask Information, and optionally Primitive Counter Information depending on the number of tiles in the tile group; and each control data block may comprise a primitive block header 420 that comprises the information listed above that is not included in the primitive block header 422 of the primitive block entry. It will be evident to a person of skill in the art that this is an example division of the primitive block header information between the primitive block entry and the control data block and the primitive block header information may be divided between the two in any suitable manner.

Multiple Control Stream Entry Types

In some cases, in addition to the fixed sized primitive block entries the control stream may comprise one or more other types of fixed-sized entries. Each of the other control stream entry types may be used to convey different information. In some cases, each control stream entry may be a 32-bit dword.

Figure 6:
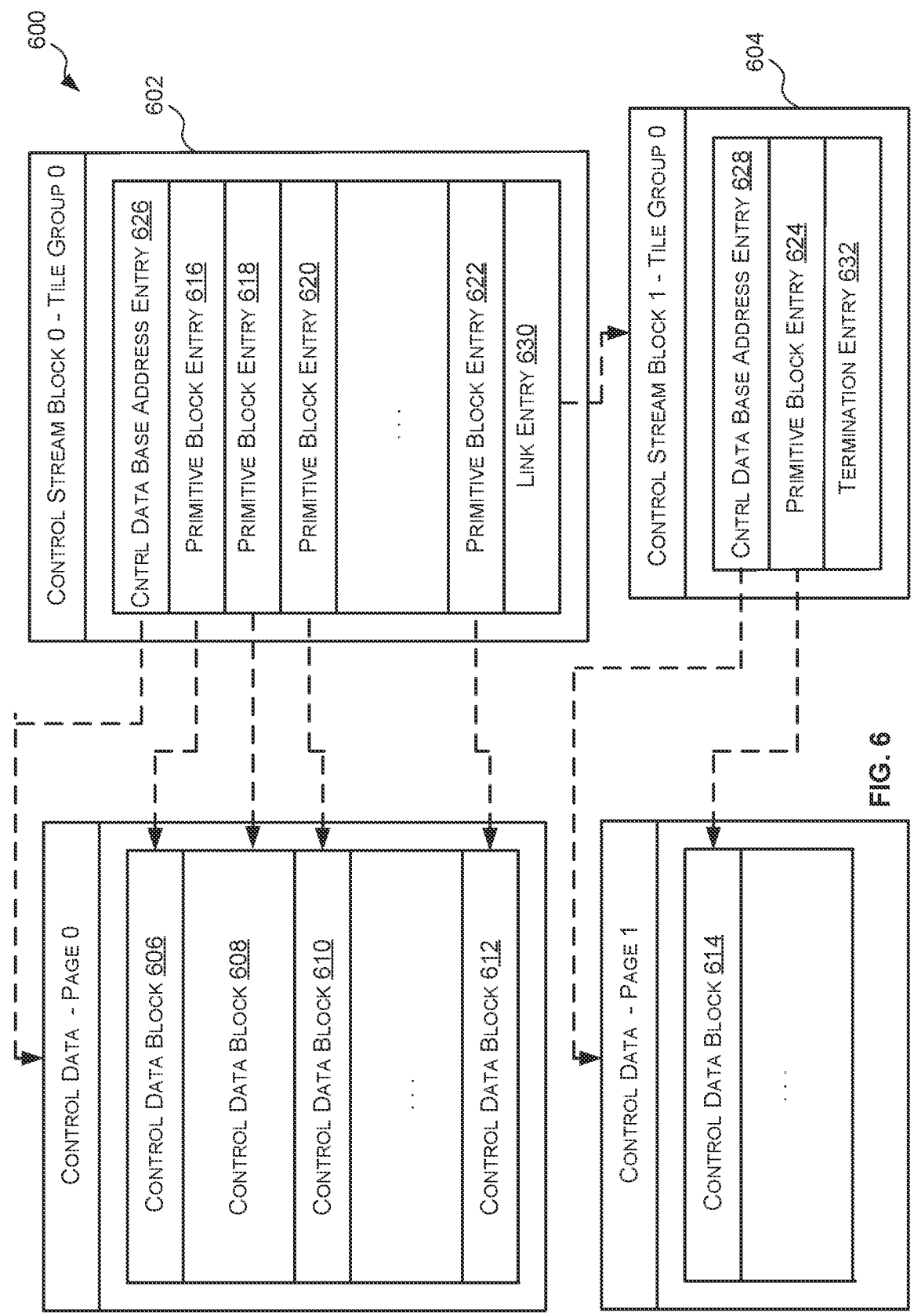
FIG. 6 is a schematic diagram of a second example control structure for a group of tiles comprising a control stream with fixed sized entries and a plurality of control data blocks linked to the control stream.

Reference is now made to FIG. 6 which illustrates a second example control stream structure 600 which comprises a control stream 602, 604 and a plurality of control data blocks 606, 608, 610, 612, 614. In this example the control stream 602, 604 comprises a fixed-length primitive block entry 616, 618, 620, 622, 624 for each primitive block that comprises at least one primitive that falls, at least partially, within the bounds of at least one tile in the tile group. Each primitive block entry 616, 618, 620, 622, 624 generally corresponds to the primitive block entries 408, 410 of FIG. 4. Specifically, each primitive block entry 616, 618, 620, 622, 624 comprises valid tile information 412 that identifies which tiles are valid for the corresponding primitive block; a data pointer 414 which comprises information that identifies the location of the corresponding control data block in memory; and, optionally, a primitive block header 422. However, in this example the control stream 602, 604 also comprises other types of entries. Specifically, in this example the control stream 602, 604 may comprise one or more control data base address entries 626, 628, one or more link entries 630 and/or a termination entry 632. Each of these control stream entry types will be described below. It will be evident to a person of skill in the art that these are examples of other control stream entry types and that in other examples the control stream may comprise: only a subset of these control stream entry types; additional control stream entry types; and/or different types of control stream entries.

Where, as in FIG. 6, the control stream 602, 604 may comprise multiple types of fixed-sized entries, each entry may have a dedicated field (e.g. a dedicated number of bits) which is used to identify the type of entry. For example, in some cases, K bits of each entry (which may be referred to herein as the entry type bits) may be used to identify the type of entry wherein K is based on the number of different types. For example, in some cases K may be equal to [$\log_2$ H] wherein H is the number of different control stream entry types. In some cases, the entry type bits may be the first K bits of each entry.

Table 1 illustrates an example of how a primitive block entry, a control data base address entry, a link pointer entry and a termination entry may be identified using two entry type bits. Specifically, if the two entry type bits are set to '00' this may identify the entry as a primitive block entry, if the two entry type bits are set to '01' this may identify the entry as a control data base address entry, if the two entry type bits are set to '10' that may identify the entry as a link pointer entry, and if the two entry type bits are set to '11' this may identify the entry as a termination entry.

TABLE 1

| Control Stream Entry Type | Entry Type Bits |
| --- | --- |
| Primitive Block Entry | 00 |
| Control Data Base Address Entry | 01 |
| Link Pointer Entry | 10 |
| Termination Entry | 11 |

Where, as in FIG. 6, the control stream 602, 604 can comprise multiple types of control stream entries, each entry may comprise valid tile information (e.g. a valid tile mask) that mimics the valid tile information 412 in the primitive block entries, however the valid tile information for all of the entries, except the primitive block entries, may be configured to indicate that none of the tiles are valid. For example, where each primitive block entry comprises a valid tile mask which comprises a bit for each tile that indicates whether or not that tile is valid for the primitive block, then each of the other control stream entries may comprise a valid tile mask which is set to all zeros. While this reduces the number of bits of the other control stream entries that are available for other information, this may allow the rasterization logic to quickly determine from the valid tile information of a plurality of control stream entries whether the primitive block entries thereof can be skipped for a particular tile. Even if it is determined that the primitive block entries on a set can be skipped for a particular tile, the other entries (e.g. control data base address entries, link entries and termination entries) in the set may be processed as normal. For example, as described in more detail below, the rasterization logic may be configured to receive a set of control stream entries (e.g. a control stream block) and may be able to quickly determine whether it needs to process any of the primitive block entries in the set by OR-ing the relevant bits of each valid tile information/field. Accordingly, by setting the valid tile mask in all of the non-primitive block entries to all zeros the rasterization logic can quickly and easily ignore or skip over a set or group of control stream entries that does not comprise a primitive block entry that is valid for a particular tile without having to analyse or decode the entries.

For example, FIG. 7 illustrates an example set of eight control stream entries 700 for a tile group comprising four tiles. It can be seen that each control stream entry comprises valid tile information (e.g. a 4-bit valid tile mask wherein a '1' indicates the corresponding tile is valid for the corresponding primitive block). However, only the valid tile information of the primitive block entries indicates a tile as being valid (e.g. only the valid tile masks of the primitive block entries comprise a '1'). The valid tile information (e.g. valid tile mask) for each other entry type indicates that none of the tiles are valid (e.g. the valid tile mask is set to all zeros). When the rasterization logic receives this set of control stream entries it may extract the bits of the valid tile information/mask of each entry that relate to the tile of interest (i.e. the tile that the rasterization logic is rendering). For example, when the first tile in the tile group is the relevant tile, the rasterization logic may select the $3^{rd}$ bit of each entry (i.e. the first bit of each valid tile information/mask); when the second tile in the tile group is the relevant tile, the rasterization logic may select the $4^{th}$ bit of each entry (i.e. the second bit of each valid tile information/mask); when the third tile in the tile group is the relevant tile, the rasterization logic may select the 5th bit of each entry (i.e. the third bit of each valid tile information/mask); and when the fourth tile in the tile group is the relevant tile, the rasterization logic may select the $6^{th}$ bit of each entry (i.e. the fourth bit of each valid tile information/mask). The rasterization logic may then OR (i.e. perform an OR operation on) the selected bits to determine whether any of the primitive block entries in the set are valid for the relevant tile. Where, as shown in FIG. 7, a '1' in the valid tile mask indicates that the corresponding tile is valid for the primitive block and a '0' in the valid tile mask indicates that the corresponding tile is not valid for the primitive block then if the result of the OR operation is '0' then this indicates that none of the primitive block entries in the set are valid for the relevant tile, and if the result of the OR operation is '1' then this indicates that at least one of the primitive block entries is valid for the relevant tile. If the result of OR-ing the selected bits indicates that none of the primitive block entries in the set are valid for the tile of interest, then the rasterization logic can quickly disregard the primitive block entries in the set without further processing them. Even if it is determined that none of the primitive block entries in a set of entries are not valid for a tile the other entries (e.g. control data base address entries, link entries and termination entries) in the set may be processed as normal. For example, since all of the bits of the valid tile masks that correspond to the first tile are zero OR-ing these bits will result in a '0' which indicates that none of the primitive block entries in the set are valid for the tile.

If, however, the result of the OR operation on the selected bits indicates that at least one of the primitive block entries in the set is valid for the relevant tile then the rasterization logic may analyse the entry type of each entry to see what, if any further processing needs to be performed on the control stream entries. For example, if the rasterization logic determines that an entry is a primitive block entry, the rasterization logic may analyse the bit of the valid tile mask corresponding to the relevant tile to determine whether the relevant tile is valid for the primitive block. If the relevant tile is valid for the primitive block, then the rasterization logic may read the data pointer to determine the address for the corresponding control data block in memory; and read the control data block from that address in memory. If the relevant tile is not valid for the primitive block, then the rasterization logic may skip to the next entry. For example, for the set of entries shown in FIG. 7 when the second tile in the tile group is the relevant tile the rasterization logic can skip primitive block entries 3, 4 and 6; when the third tile in the tile group is the relevant tile the rasterization logic can skip primitive block entries 1, 3 and 5; and when the fourth tile in the tile group is the relevant tile the rasterization logic can skip primitive block entries 4, 5 and 6.

If, however, the rasterization logic determines from the entry type bits that an entry is not a primitive block entry then it may perform an action based on the type of entry. For example, as described in more detail below, where the entry is a control data base address entry the rasterization logic may store the control data base address; where the entry is a link entry the rasterization logic may read the next control stream block from memory; and where the entry is a termination entry the rasterization logic may complete the processing of the relevant tile and beginning processing the next tile. The processing of the control stream by the rasterization logic will be described in more detail below.

Control Data Base Address Entry

As described above, the data pointer 414 of a primitive block entry may not comprise the full address of the corresponding control data block in memory, but may comprise an offset which, in combination with a base address, can be used to generate the full address of the control data block. For example, the base address may specify the X most significant bits of the address and the offset may specify the Y least significant bits of the address wherein the full address comprises X+Y bits wherein X and Y are integers greater than or equal to 1. In these cases, the control stream may comprise one or more control data base address entries which specify the control data base address (e.g. the X most significant bits of the control data block address).

Figure 8:
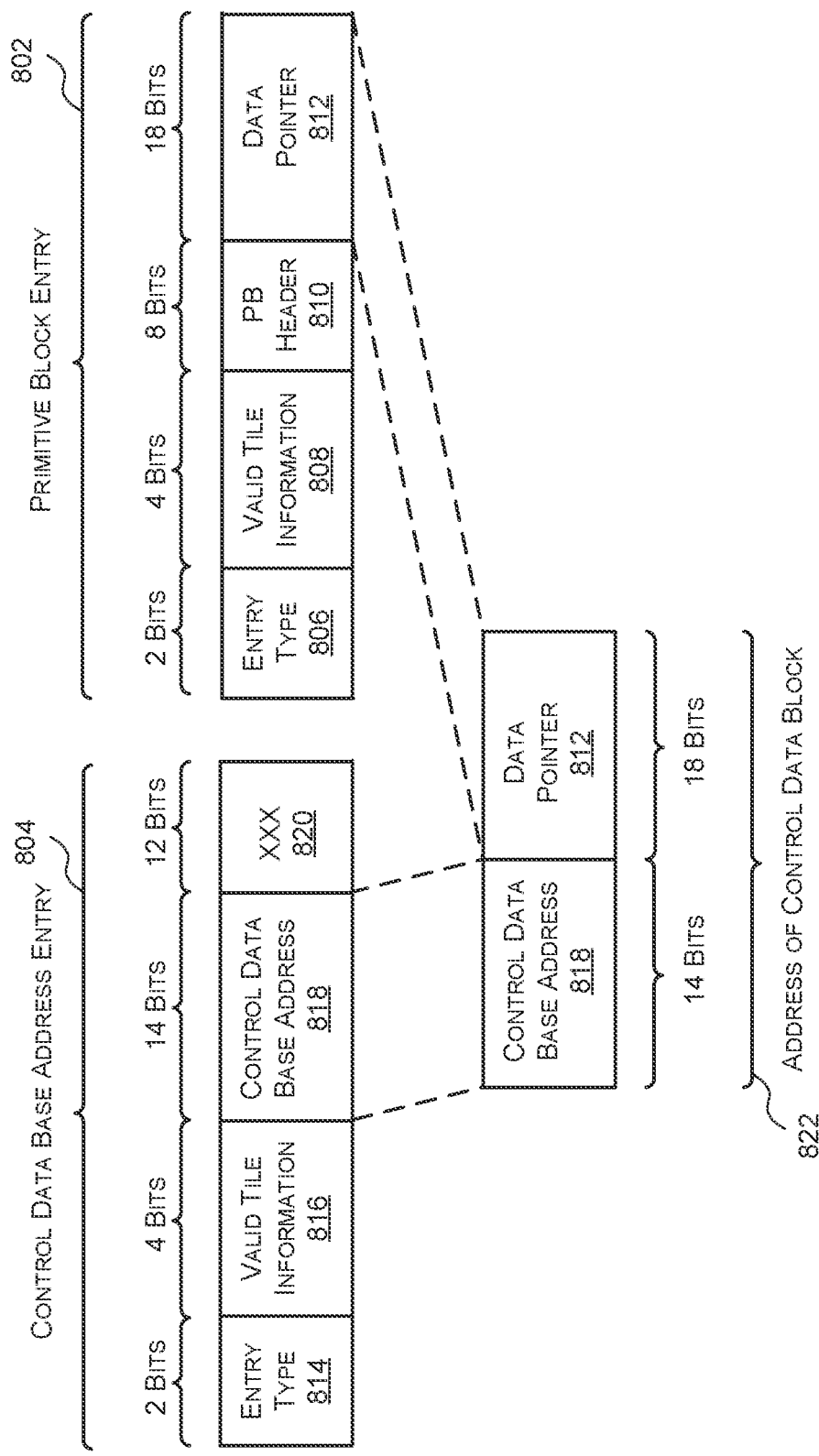
FIG. 8 is schematic diagram illustrating generating the address of a control data block from an example control data base address entry and a primitive block entry.

In some cases, the base address may be specified by a single control base address entry. In other words, in some cases the X MSBs may be specified in a single control base address entry. FIG. 8 illustrates an example configuration of a primitive block entry 802 and a control data base address entry 804 in which the X MSBs of the address of the control data block are specified in a single control data base address entry. In this example the address of the control data block comprises 32 bits, each tile group comprises four tiles, and each control stream entry is 32 bits. The example primitive block entry 802 comprises a two-bit entry type field 806 which specifies the entry type, a four-bit valid tile information field 808 (e.g. a four-bit valid tile mask) which specifies which tiles are valid for the corresponding primitive block, an eight-bit primitive block header field 810 which may specify information about the primitive block and/or primitive masks as described above, and an eighteen-bit data pointer field 812 which specifies the eighteen LSBs of the address of the corresponding control data block. In this example a control data base address entry 804 comprises a two-bit entry type field 814, a four-bit valid tile information field 816 (e.g. a four-bit valid tile mask) which is set to indicate that none of the tiles are valid, a fourteen-bit control data base address field 818 which specifies the fourteen MSBs of the address of the control data block corresponding to any following entry. The remaining twelve bits 820 of the control data base address entry 804 may not be used. The address of the control data block 822 may be generated by using the fourteen-bits from the control data base address field 818 as the MSBs and the eighteen bits from the data pointer field 812 as the LSBs.

Figure 9:
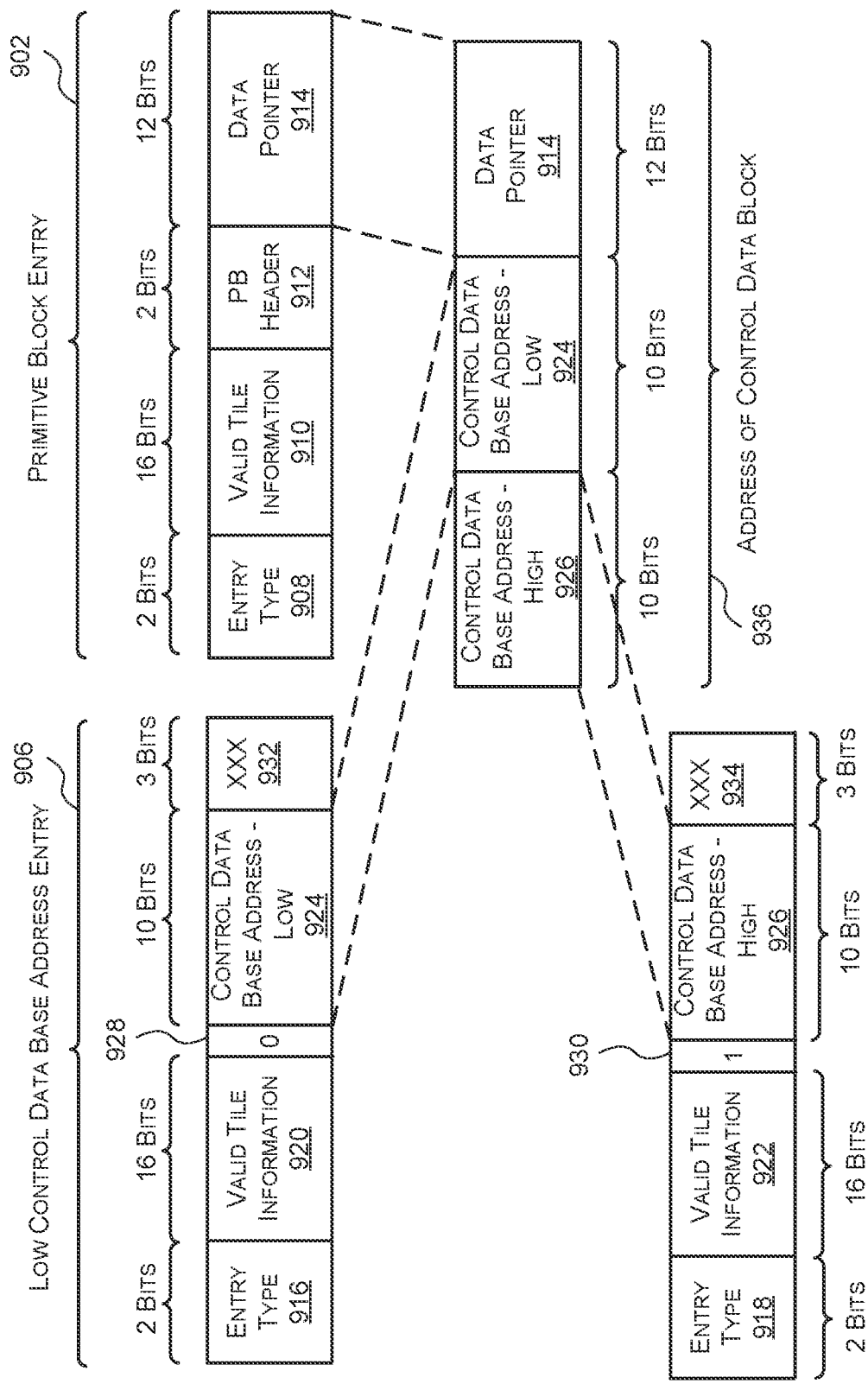
FIG. 9 is a schematic diagram illustrating generating the address of a control data block from an example set of control data base address entries and a primitive block entry.

However, depending on the size of the control stream entries and the number of tiles in a tile group (and thus the number of bits in the valid tile mask) it may not be possible to specify all X MSBs in a single control data base address entry. Accordingly, the X MSBs may be specified over several control data base address entries. In these cases, there may be multiple types of control data base entries each which specifies a different portion of the X MSBs. For example FIG. 9 illustrates an example configuration of a primitive block entry 902 and control data base address entry 904, and 906 in which the X MSBs of the address of control data block are specified over two control data base address entries. In this example a control data block address comprises 32 bits, each tile group comprises sixteen tiles and each control stream entry is 32 bits. The example primitive block entry 902 comprises a two-bit entry type field 908 which specifies the entry type, a sixteen-bit valid tile information field 910 (e.g. a sixteen-bit valid tile mask) which specifies which tiles are valid for the corresponding primitive block, a two-bit primitive block header field 912 which may specify information about the primitive block and/or primitive masks as described above, and a twelve-bit data pointer field 914 which specifies the twelve LSBs of the address of the corresponding control data block.

In the example of FIG. 9 there are two types of control data base address entries—a high control data base address entry 904 which specifies the highest bits of the X MSBs and a low control data base address entry 906 which specifies the lowest bits of the X MSBs. Each control data base address entry 904, 906 comprises a two-bit entry type field 916, 918 which specifies the entry type, a sixteen-bit valid tile information field 920, 922 (e.g. a sixteen-bit valid tile mask) which indicates that none of the tiles are valid, and a ten-bit control data base address field 924, 926 which is used to specify ten bits of the base address. The only difference between the two control data base address entries 904, 906 is that in the high control data base address entry the $19^{th}$ bit 930 is set to '1' to indicate that the highest ten bits are being specified, and in the low control data base address entry the $19^{th}$ bit 928 is set to '0' to indicate that the lower ten bits are being specified. In this example the final three bits 932, 934 of the control data base address entries may not be used. The address of the control data block 936 for a primitive block entry may be generated by using the bits of the control data base address field 926 of the high control data base address entry 904 as the first ten bits, using the bits of the control data base address field 924 of the low control data base address entry 906 as the next ten bits, and using the twelve bits from the data pointer field 914 of the primitive block entry 902 as the last twelve bits.

In the example of FIG. 9 each control data base address entry specifies the same number of bits of the base address, however, in other examples the different control data base address entries may specify a different number of bits of the base address. For example, the high control data base address entry may specify the top 12 bits of the address and the low control data base address entry may specify the next 8 bits of the address.

In some cases, the control data blocks corresponding to the primitive block entries in a control stream may be packed into memory (e.g. they may be placed back to back in the memory). For example, the control stream for a group of tiles may be allocated a page of memory for storing the related control data blocks. The control data blocks may be written to the allocated page one after another (e.g. back to back) until the page is full. Once the allocated page is full a new page may be allocated and the subsequent control data blocks for the control stream are written to the new page until that page is full and so on. This packing of the control data blocks in memory allows the same base address to be used to calculate the address of multiple control data blocks. Accordingly, once the base address is set by a control data base address entry (or a set of control data base entries) then that base address may be used to calculate the address of control data block for each subsequent primitive block entry until the base address is updated by a subsequent control data base entry (or entries). In some cases, as shown in FIG. 6, the base address may be updated when a new page is allocated to the control stream.

FIG. 10 shows an example set of control stream entries 1000 wherein a single control data base address entry specifies the entire base address (e.g. as described with respect to FIG. 8). In this example, control data base address entry 1 sets the control data base address to 'Base Address 1' and the control data base address entry 2 sets the control data base address to 'Base Address 2'. 'Base Address 1' may point to a first page in memory and 'Base Address 2' may point to a second page in memory. In this example, the address of the control data blocks for primitive block entries 1, 2 and 3 will be calculated from 'Base Address 1' because at the time these primitive block entries are processed by the rasterization logic the base address will be set to 'Base Address 1'; and the address of the control data blocks for primitive block entries 4 and 5 will be calculated from 'Base Address 2' because at the time these primitive block entries are processed by the rasterization logic the base address will be set to 'Base Address 2'.

Where the base address is specified by multiple control data base address entries (e.g. as described with respect to FIG. 9) then when the base address needs to be updated (e.g. when a new page is allocated to the control stream for control data blocks) only a portion of the address may need to be updated. This may mean that only one type of control data base address entry may be added to the control stream to update the base address. For example, if the new page is close to the previous page only the lower bits of the base address may need to be updated.

FIG. 11 shows an example set of control stream entries 1100 wherein the base address is specified by two control data base address entries (e.g. as described with respect to FIG. 9). In this example, the high control data base address entry 1 sets the top (e.g. MSB) bits of the base address to 'High Base Address 1', the low control data base address entry 1 sets the bottom (e.g. LSB) bits of the base address to 'Low Base Address 1', and the low control data base address entry 2 sets the bottom (e.g. LSB) bits of the base address to 'Low Base Address 2'. The combination of 'High Base Address 1' and 'Low Base Address 1' may specify the address of a first page in memory and the combination of 'High Base Address 1' and 'Low Base Address 2' may specify a second page in memory. In this example, the address of the control data blocks for primitive block entries 1 and 2 will be calculated from 'High Base Address 1'+'Low Base Address 1' because at the time these primitive block entries are processed by the rasterization logic the base address will be set to 'High Base Address 1'+'Low Base Address 1'; and the address of the control data blocks for primitive block entries 3 and 4 will be calculated from 'High Base Address 1'+'Low Base Address 2' because at the time these primitive block entries are processed by the rasterization logic the base address will be set to 'High Base Address 1'+'Low Base Address 2'.

Link Entry

In some cases, as shown in FIG. 6, the control stream 602, 604 may be divided into a sequence of control stream blocks 602, 604 which are stored separately in memory. Each control stream block may have a maximum size. In some cases, the maximum size of a control stream block may be an integer multiple of the control stream entry size. For example, in some cases, where each control stream entry is a dword each control stream block may be a maximum size of 32 dwords. Where the control stream is divided into a sequence of control stream blocks, the control stream may comprise one or more link entries 630 which link the control stream blocks together. Specifically, each link entry may specify an address of, or a pointer to, the next control stream block in the sequence. For example, in FIG. 6 the link entry 630 in the first control stream block 602 (Control Stream Block 0) would include the address of, or a pointer to, the second control stream block 604 (Control Stream Block 1). When the rasterization logic encounters a link entry 630 in a control stream block it may trigger the rasterization logic to read, using the specified address or pointer, the next control stream block from memory.

In some cases, as shown in FIG. 6, the link entry 630 may be the last entry in each control stream block, other than the last control stream block. In some cases, the rasterization logic may be able to read a whole control stream block at a time. For example, in some cases where a control stream block is 32 dwords the memory may support 4-beat burst reads wherein each burst is 256 bits or 32 bytes. In other cases, the rasterization logic may only be able to read a portion of a control stream block at a time.

Termination Entry

In some cases, the last entry of a control stream may be a termination entry 632 which signals to the rasterization logic the end of the control stream. Specifically, when the rasterization logic encounters a termination entry 632 it may complete the processing of the current control stream for the relevant tile and start processing another control stream for another tile.

Tiling Engine

Figure 12:
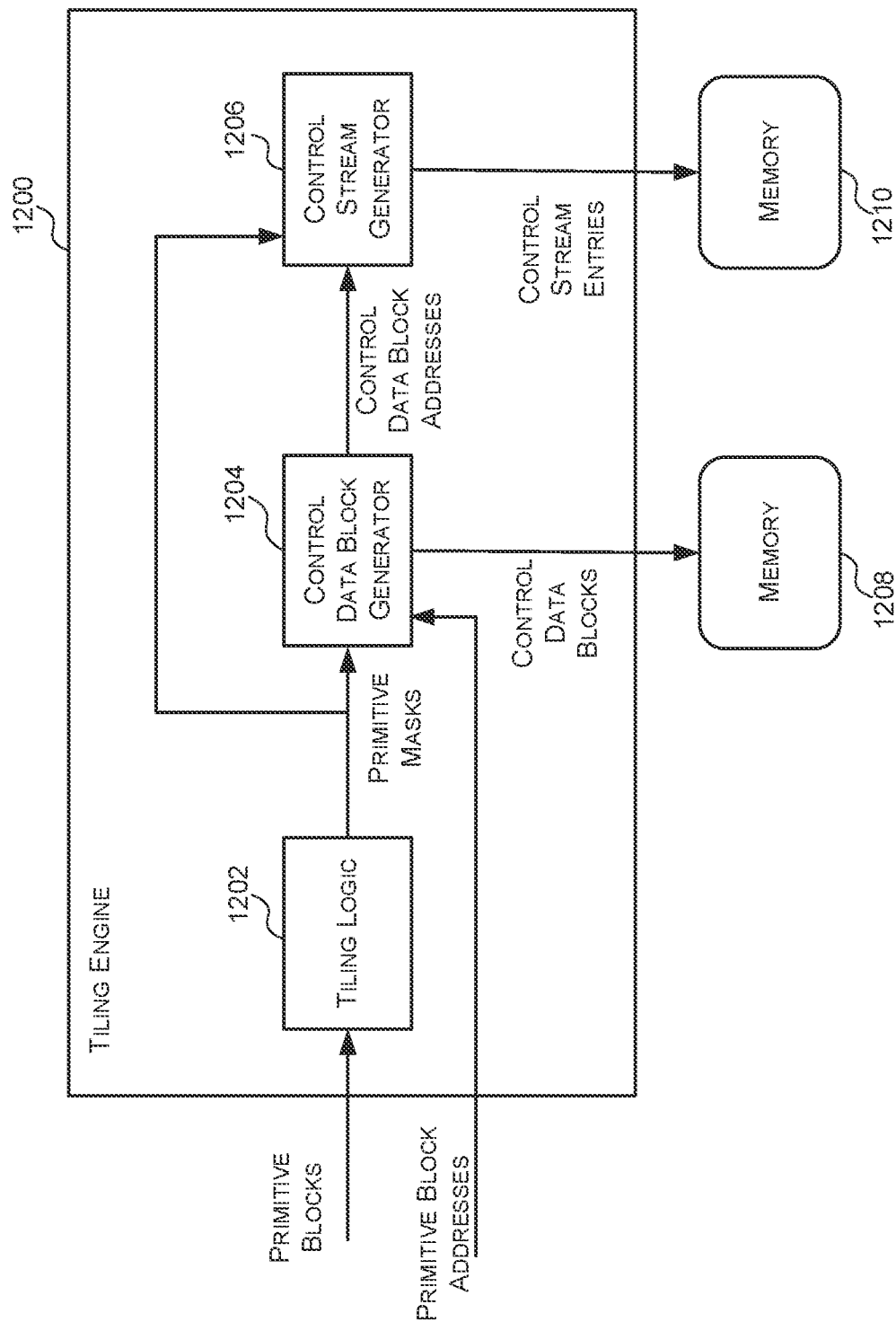
FIG. 12 is a block diagram of an example tiling engine.

Reference is now made to FIG. 12 which illustrates an example tiling engine 1200 which is configured to generate a control structure for a group of tiles as described above which identifies which primitives fall within each tile of the tile group. The tile group may comprise any set of N×M tiles in the render space wherein N and M are integers greater than or equal to one. As described above, the control structure comprises a control stream and one or more control data blocks which are linked to the control stream. The tiling engine 1200 comprises tiling logic 1202, a control data block generator 1204 and a control stream generator 1206.

The tiling logic 1202 is configured to (i) receive a plurality of primitive blocks as described above wherein each primitive block comprises one or more primitives (e.g. the transformed geometry data related thereto); (ii) determine, for each received primitive block, which primitives of that primitive block, fall, at least partially, within the bounds of each of the tiles in a tile group (this may be referred to herein as tiling the primitives); and (iii) output the results of the determination. In some cases, the output may be in the form of a set of primitive masks for each primitive block in which the set of primitive masks comprises a primitive mask for each tile in the tile group. As described above, each primitive mask may comprise a bit for each primitive in the primitive block that indicates whether or not that primitive falls, at least partially, within the bounds of the tile.

The tiling logic 1202 may use any suitable method for determining whether a primitive falls, at least partially, within the bounds of a tile. For example, in some cases the tiling logic 1202 may use a simple, less accurate, method, such as a simple bounding box tiling method, to determine whether a primitive, at least partially, falls within a tile so as to quickly sort the primitives into tiles. As is known to those of skill in the art, in a bounding box method a bounding box that encompasses the primitive is identified (e.g. the smallest axis-aligned bounding box that encompasses the vertices of the primitive). The bounding box may be generated using any suitable method. For example, the tiling logic 1202 may generate a bounding box by finding the minimum and maximum X and Y coordinates of the vertices of the primitive and forming an axis-aligned bounding box from those coordinates. The bounding box may be generated at any granularity or resolution. For example in some cases, the bounding box may be at the X and Y coordinate resolution (i.e. the bounding box may be defined by the maximum and minimum X and Y coordinates of the vertices). In other cases, the bounding box may be at the tile resolution (i.e. the closest tile edges that encompass the primitive). Once the tiling logic 1202 has identified a bounding box for a primitive, the tiling logic 1202 may determine that the primitive, at least partially, falls within tile if the bounding box at least partially overlaps with the tile. In other words, a primitive may be determined to, at least partially, fall within a tile if the bounding box for that primitive, at least partially, falls within the bounds of the tile. While a bounding box method can be used to quickly and efficiently determine whether a primitive, at least partially, falls within a tile, it is not 'perfect' tiling as the bounding box is often larger than the primitive which may result in a primitive being determined to be in a tile when in fact it is not in the tile.

Figure 13:
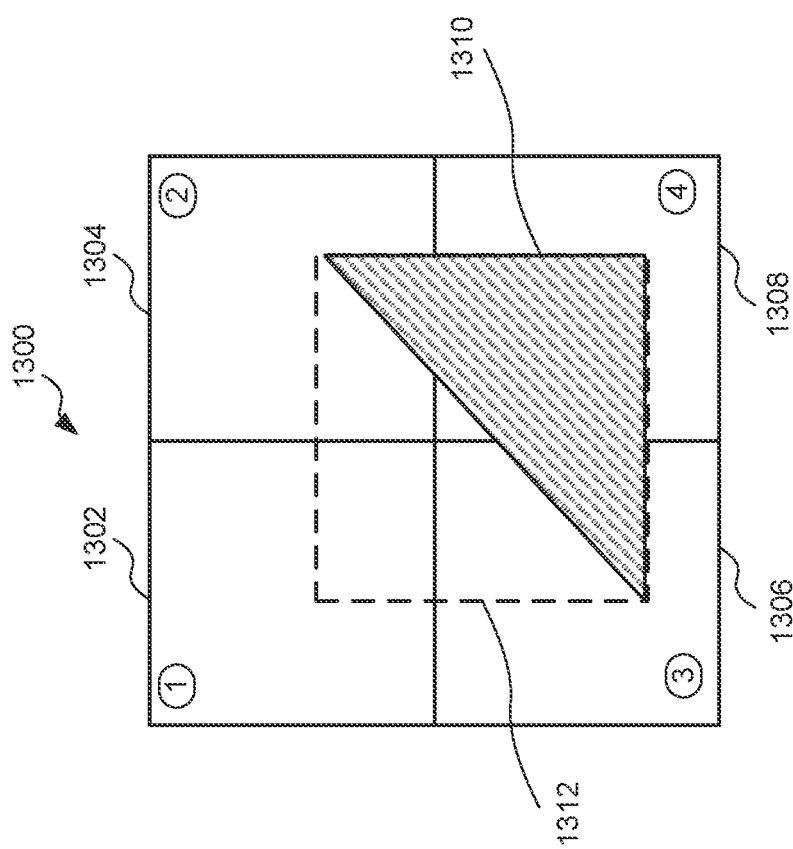
FIG. 13 is a schematic diagram illustrating a bounding-box tiling method.

For example, FIG. 13 shows an example tile group 1300 comprising four tiles 1302, 1304, 1306, and 1308. If a simple axis-aligned bounding box method is used to determine which of these tiles 1302, 1304, 1306, 1308 a primitive 1310, at least partially, falls within, then a bounding box 1312 around the primitive 1310 is generated. Since the bounding box 1312 at least partially overlaps with all of the tiles 1302, 1304, 1306, 1308 it may be determined that the primitive 1310 falls, at least partially, within each of the four tiles 1302, 1304, 1306, 1308 even though it actually only falls within, or overlaps, with three of the tiles 1304, 1306, 1308. However, determining that a primitive falls within a tile when it does not actually fall within the tiles will not cause an error and the primitive will simply be discarded in the rasterization phase. However, determining that a primitive does not fall within a tile that it does fall within may cause an error in the rasterization phase. Accordingly, it is advantageous for the tiling to be conservative. In other words, it is better to indicate a primitive falls within a tile even though the primitive does not actually fall within the tile than to not include a primitive that actually does fall within the tile.

In other cases, however, the tiling logic 1202 may use a more complicated and/or more accurate method, such as a perfect tiling or near perfect tiling method, to determine whether a primitive falls within a tile. An example perfect tiling method, which may be used by the tiling logic 1202, is described in the Applicant's Published GB Patent Application No. 2549789 which is herein incorporated by reference in its entirety.

The control data block generator 1204 receives the results (e.g. primitive masks) output by the tiling logic 1202 and the address of each primitive block in memory. Then the control data block generator 1204 is configured to, for each primitive block that comprises at least one primitive that falls, at least partially, within the bounds of at least one tile in the tile group (i) generate a control data block for that primitive block (e.g. the control data block 404, 406 described above with respect to FIG. 4); (ii) store the generated control data block in memory 1208; and (iii) output the address of the control data block in memory. As described above, the control data block for a primitive block comprises the address of the primitive block in memory and may comprise one or more of the primitive masks generated by the tiling logic 1202. In some cases, the control data block for a primitive block may also comprise a primitive block header that may include additional information about the primitive block and/or the primitive masks such as, but not limited to, the number of primitives in the primitive block, the format of the primitive masks in the control data block etc. As described above, the control data block generator 1204 may initially be allocated a page of memory to store the control data blocks for the group of tiles and may pack the control data blocks in the allocated page in memory, and once the page of memory is full a new page may be allocated to the group of tiles for storing the control data blocks.

The control stream generator 1206 receives the results (e.g. primitive masks) output by the tiling logic 1202 and the address of each control data block. Then the control stream generator 1206 is configured to, for each primitive block that comprises at least one primitive that falls, at least partially, within the bounds of at least one tile in the tile group (i) generate a fixed-sized primitive block entry (e.g. a primitive block entry 408, 410 described above with respect to FIG. 4); and (ii) store the generated primitive block entry in memory 1210 as part of a control stream for the group of tiles. As described above, the primitive block entry for a primitive block comprises valid tile information (e.g. a valid tile mask with a bit per tile in the tile group) identifying which of the tiles in the tile group are valid for the primitive block; and a data pointer that points to the corresponding control data block in memory 1208. A primitive block entry may also comprise a primitive block header which may include additional information about the primitive block and/or the corresponding control data block.

In some cases, the control stream generator 1206 may also be configured to interleave other types of entries amongst the primitive block entries in memory 1210. For example, as described above, in some cases the data pointer of the primitive block entries may only comprise an offset which can be combined with a base address to generate the address of the corresponding control data block in memory. In these cases the control stream generator 1206 may be configured to generate and store a base address entry (as described above) in the memory 1210 when it is determined that the base address for the control data blocks has changed (e.g. when the control data blocks are being written to a new page of memory).

Furthermore, as described above, in some cases the control stream may be stored in memory in control stream entry blocks where each block has a maximum number of entries. In these cases, the control stream generator 1206 may be configured to build a control stream block by adding the entries to the control stream block until the maximum number of entries has been reached. Once the maximum number of entries less one has been reached the control stream generator 1206 may be configured to add a link entry to the control stream block indicating where the next control stream block will be stored in memory, and then write the control stream block to memory. The control stream generator 1206 may be configured to continue to build control stream blocks until the last primitive block entry has been generated.

In some cases, the control stream generator 1206 may be configured to, once it has generated the last primitive block entry for the tile group, store a termination entry (as described above) in memory to indicate the end of the control stream for that tile group.

Figure 14:
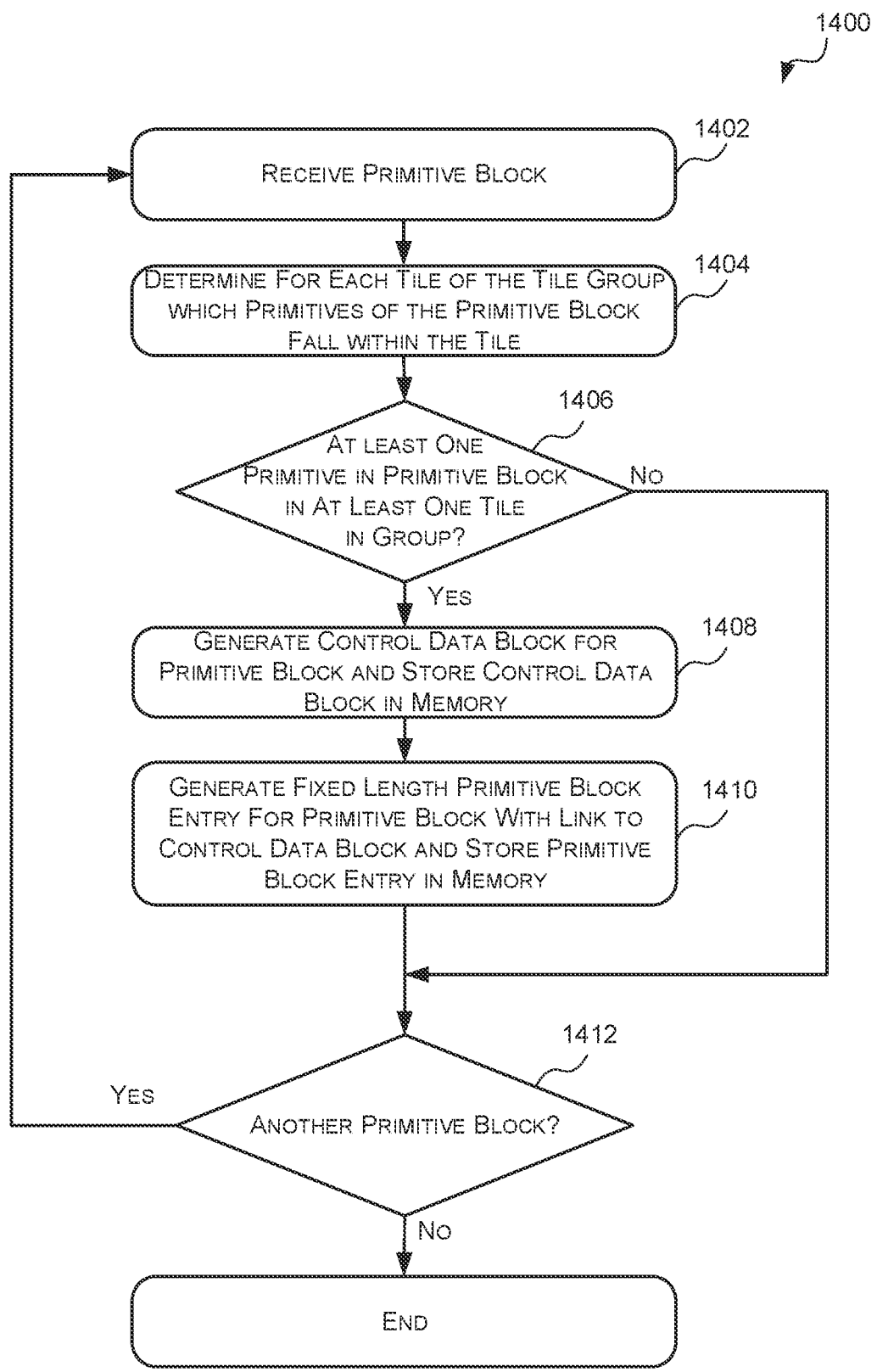
FIG. 14 is a flow diagram of an example method of generating the control structure of FIG. 4 or 6.

Reference is now made to FIG. 14 which illustrates an example method 1400 for generating a control structure for a group of tiles which may be implemented by the tiling engine 1200 of FIG. 12. The method 1400 begins at step 1402 where the tiling engine receives a primitive block. As described above, a primitive block comprises one or more primitives (e.g. the transformed geometry related thereto). Once the primitive block has been received at the tiling engine the method 1400 proceeds to step 1404 where the tiling engine determines for each tile in the tiling group which of the primitives of the primitive block fall, at least partially, within the bounds of the tile. In other words, it is determined for each tile in the tile group which of the primitives in the primitive block overlap or intersect with the tile. Any tiling method can be used to determine whether a primitive falls, at least partially, within the bounds of a tile. Example tiling methods which may be used to determine whether a primitive, at least partially, within the bounds of a tile were described above. Once it has been determined, for each tile, of the tile group, which primitives fall, at least partially, within the bounds of the tile the method 1400 proceeds to step 1406.

At step 1406, it is determined at the tiling engine, based on the determinations of step 1404, whether there is at least one primitive of the primitive block that falls, at least partially, within the bounds of at least one of the tiles of the tile group. If none of the primitives of the primitive block fall, at least partially, within the bounds of at least one tile in the tile group then the primitive block is not relevant to the rendering of the tiles in the tile group and the method 1400 proceeds to step 1412. If, however, at least one of the primitives of the primitive block fall, at least partially, within the bounds of at least one tile in the tile group then the method 1400 proceeds to step 1408.

At step 1408, the tiling engine generates a control data block for the primitive block and stores the control data block in a section of memory designated for control data blocks. As described above, the control data block for a primitive block comprise the address of the primitive block in memory and may comprises one or more primitive masks.

In some cases, the control data block for a primitive block may also comprise a primitive block header that may include additional information about the primitive block and/or the primitive masks such as, but not limited to, the number of primitives in the primitive block, the format of the primitive masks in the control data block etc. As described above, the tile group may initially be allocated a page of memory to store the control data blocks for the tile group and the control data blocks may be packed in the allocated page in memory until the page is full. Once the page of memory is full a new page may be allocated to the tile group. The method 1400 then proceeds to step 1410.

At step 1410, the tiling engine generates a primitive block entry for the primitive block and stores the primitive block entry in memory as part of a control stream for the tile group. As described above, the primitive block entry for a primitive block comprises valid tile information (e.g. a valid tile mask with a bit per tile in the tile group) identifying which of the tiles in the tile group are valid for the primitive block; and a data pointer that points to the corresponding control data block in memory. A primitive block entry may also comprise a primitive block header which may include additional information about the primitive block and/or the corresponding control data block. The method 1400 then proceeds to step 1412.

At step 1412, it is determined whether there any more primitive blocks. If there is at least one more primitive block, then the method 1400 proceeds back to step 1402 where the next primitive block is received. If, however, there are no more primitive blocks then the method 1400 ends.

Although in the method 1400 of FIG. 14 the primitive block entry for the current primitive is stored in memory before the next primitive block is processed, in other examples all or a portion of the primitive block entries may be generated before they are stored in memory. For example, in some cases the primitive block entries may be packed into control stream blocks and it is the control stream blocks that are stored in memory.

Figure 15:
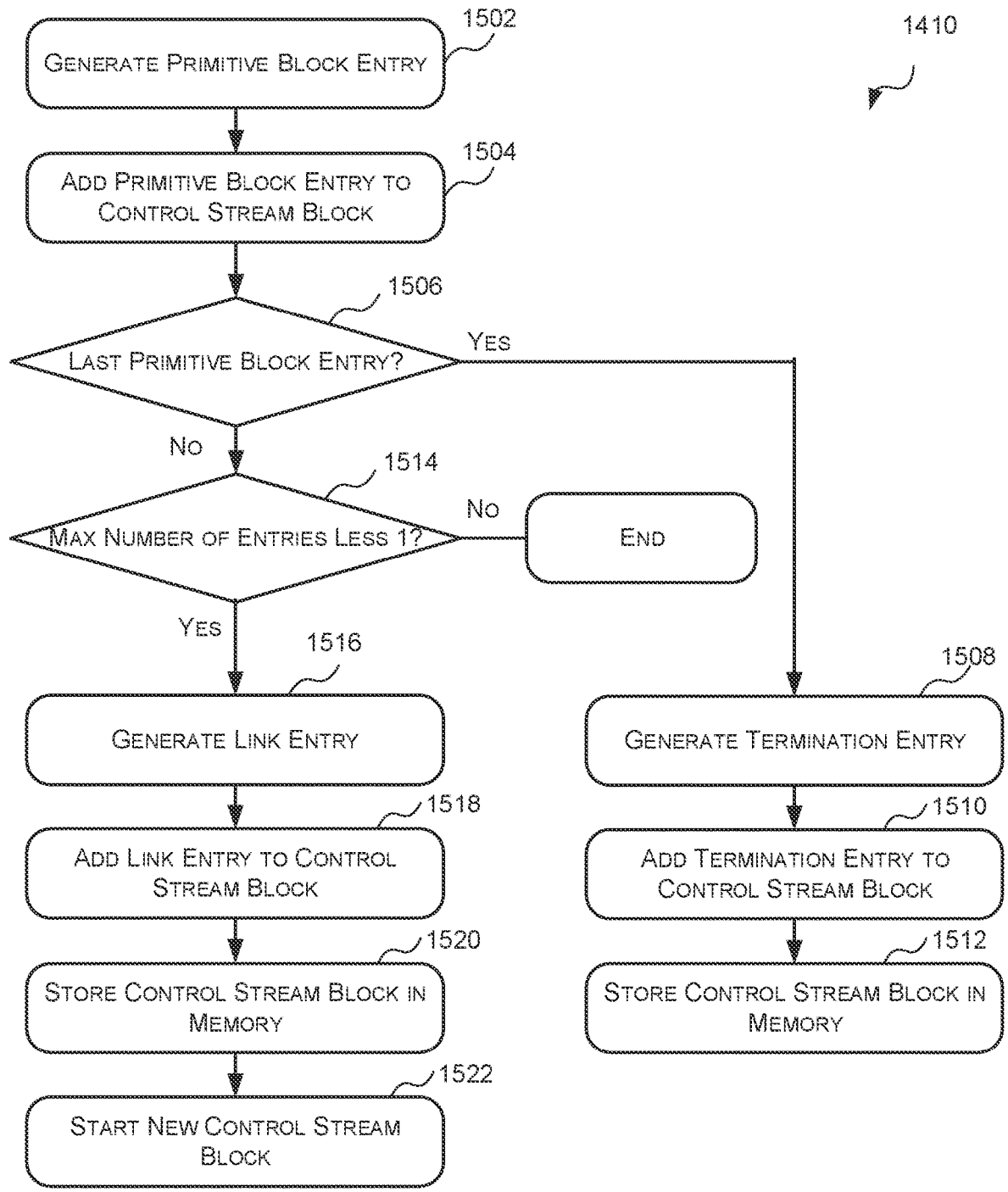
FIG. 15 is a flow diagram of an example method to implement step 1410 of the method of FIG. 14 where the control stream is stored in control stream blocks.

Reference is now made to FIG. 15 which illustrates an example method to implement step 1410 wherein the primitive block entries are packed into control stream blocks, each control stream block having a maximum number of entries. The method 1410 may be implemented by the tiling engine 1200 of FIG. 12. The method 1410 begins at step 1502 where the tiling engine generates a primitive block entry (as described above) for the primitive block. The method 1410 then proceeds to step 1504 where the tiling engine adds the primitive block entry to the current control stream block. The method 1410 then proceeds to step 1506 where the tiling engine determines whether this is the last primitive block entry. If it is determined that this is the last primitive block entry then the method 1410 proceeds to steps 1508, 1510 and 1512 where the tiling engine generates a termination entry (as described above) to indicate the end of the control stream, adds the termination entry to the current control stream block, and stores the current control stream block in memory. For example, in FIG. 6, after the tiling engine generates the last primitive block entry 624 of the control stream, the tiling engine adds the primitive block entry 624 to the current control stream block 604; generates a termination entry 632; adds the termination entry 632 to the current control stream block 604; and stores the current control stream block 604 in memory.

If, however, the tiling engine determines at step 1506 that this is not the last primitive block entry in the control stream the method 1410 proceeds to step 1514 where the tiling engine determines whether the current control stream block has the maximum number of entries less one. For example, if each control stream block can have a maximum of 32 entries (including the link entry to the next control stream block, if necessary) then the tiling engine determines whether there are now 31 entries in the current control stream block. If the tiling engine determines that there are less than the maximum number of entries less one in the current control stream block, then the method 1410 ends. If, however, the tiling engine determines at step 1514 that the current control stream block comprises the maximum number of entries less one (e.g. 31 entries) then the method 1410 proceeds to step 1516.

At step 1516, the tiling engine generates a link entry. As described above, a link entry comprises information identifying the location of the next control stream block in memory. The information identifying the location of the next control stream block may be an address of the next control stream block in memory. Generating a link entry may comprise determining the location of the next control stream block in memory by requesting a new chunk of memory for storing the next control stream block. Once the link entry has been generated the method proceeds to steps 1518 and 1520 where the link entry is added to the control stream block and the control stream block is stored in memory. The method 1410 then proceeds to block 1522 where a new control stream block is generated, and the new control stream block becomes the current control stream block and the method 1410 ends. For example, in FIG. 6 after the tiling engine generates primitive block entry 622 and adds the primitive block entry 622 to the first control stream block 602, the tiling engine may determine that now the control stream block comprises the maximum number of entries less one. The tiling engine then generates a link entry 630 which identifies the location at which the next control stream block 604 is to be stored in memory, adds the link entry 630 to the first control stream block 602, and stores the control stream block 602 in memory.

Control Stream Decoder

Figure 16:
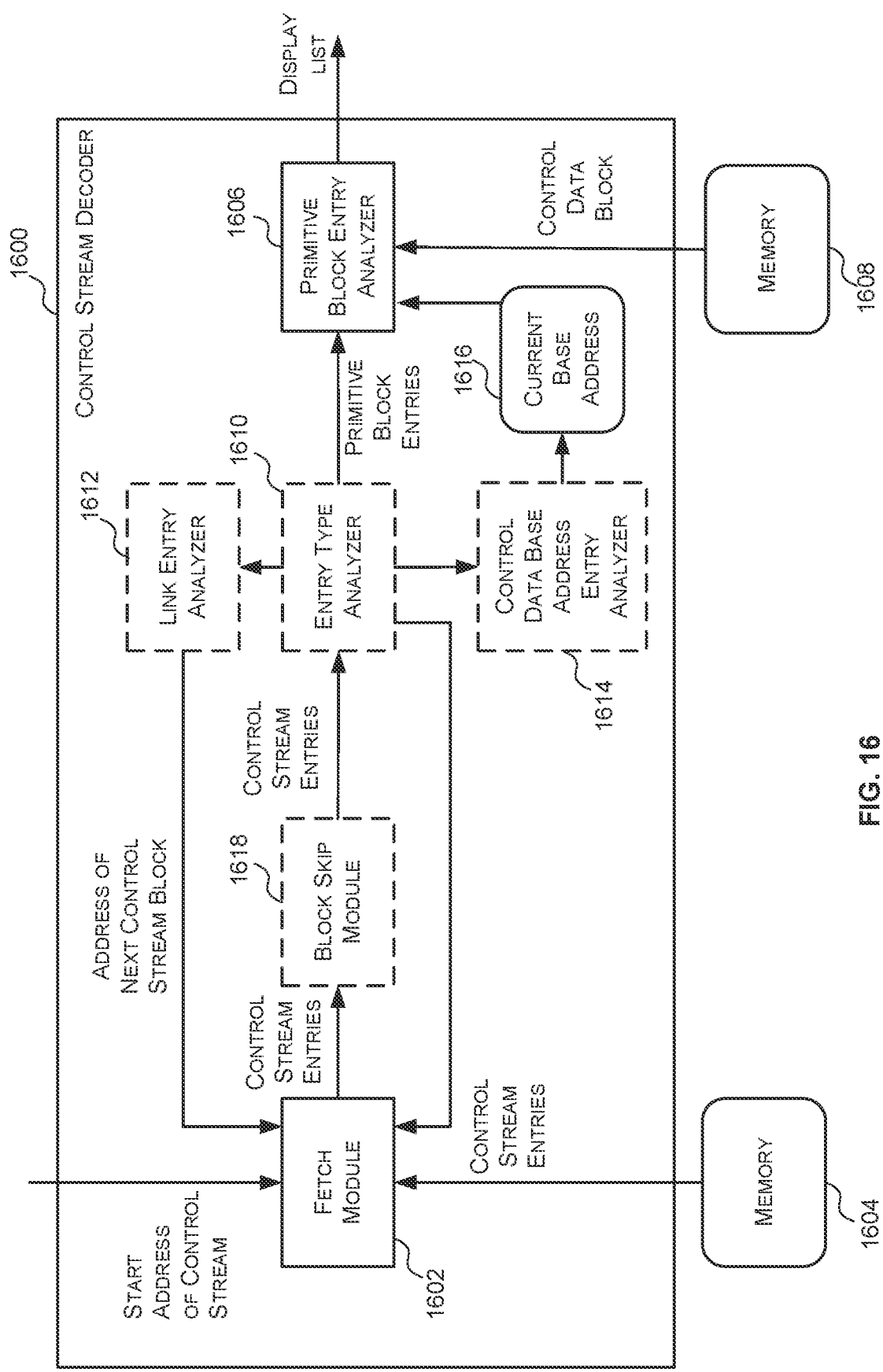
FIG. 16 is a block diagram of an example control stream decoder.

Reference is now made to FIG. 16 which illustrates an example control stream decoder 1600 for decoding the control stream of FIG. 4 or FIG. 6 for a group of tiles to identify the primitives to be used to render a current tile of the tile group. The control stream decoder 1600 comprises a fetch module 1602 which is configured to fetch a set of control stream entries (e.g. a control stream block) of the control stream from memory 1604 and a primitive block entry analyser 1606 which is configured to (i) analyse each primitive block entry thereof to determine whether the corresponding primitive block is relevant to the current tile, and (ii) if it is determined that the corresponding primitive block is relevant to the current tile, fetch the corresponding control data block in memory. For example, the primitive block entry analyser 1606 may be configured to receive a primitive block entry and examine the bit of the valid tile mask corresponding to the current tile to determine if the current tile is valid for the corresponding primitive block. If it is determined that the current tile is valid for the corresponding primitive block then the primitive block entry analyser 1606 may identify the address of the control data block for that primitive block from the data pointer information (and optionally from the control data base address) as described above. Once the primitive block entry analyser 1606 has identified the address of the control data block, the primitive block entry analyser retrieves the control data block from that address of memory 1608. An example method for analysing a primitive block entry which may be implemented by the primitive block entry analyser 1606 is described below with respect to FIG. 17.

In some cases, where the control stream can comprise different types of entries (e.g. control data base address entries, link entries and/or termination entries) the control stream decoder 1600 may also comprise an entry type analyser 1610, and/or a link entry analyser 1612 and a control data base address entry analyser 1614. The entry type analyser is configured to receive the control stream entries fetched by the fetch module, determine the type of each entry, and forward the entry to the appropriate analyser for processing. For example, if the entry type analyser determines from, for example, the entry type bits of the control stream entry that the control stream entry is a primitive block entry then the entry type analyser 1610 may forward the control stream entry to the primitive block entry analyser 1606, which as described above determines, from the primitive block entry, whether the current tile is valid for the corresponding primitive block and if so, retrieves the corresponding control data block from memory. If, however, the entry type analyser 1610 determines from, for example, the entry type bits of the control stream entry that the control stream entry is a link entry then the entry type analyser 1610 may forward the control stream entry to the link entry analyser 1612. If, however, the entry type analyser 1610 determines, from, for example, the entry type bits of the control stream entry that the control stream entry is a control data base address entry then the entry type analyser 1610 may forward the control stream entry to the control data base address entry analyser 1614. If, though, the entry type analyser determines from, for example, the entry type bits of the control stream entry that the control stream entry is a termination entry then the entry may understand that the end of the control stream has been reached. The control stream decoder 1600 may then start processing another tile by retrieving the control stream entries for the tile group comprising that tile. An example method which may be implemented by the entry type analyser is described below with respect to FIG. 18.

The control data base address entry analyser 1614 is configured to receive control data base address entries from the entry type analyser 1610 and extract the new control data base address, or the new portion of the control data base address, identified therein. For example, as described above with respect to FIGS. 8-11 in some cases each control data base address entry may identify a complete control data base address (e.g. FIGS. 8 and 10); and in other cases each control data base address entry may only specify a portion (e.g. the top K bit or the bottom K bits) of a control data base address and thus a complete control data base address is specified by multiple control data base address entries. In the former case the control data base address entry analyser 1614 may be configured to extract the new control data base entry identified therein. In the latter case the control data base address entry analyser 1614 may be configured to determine which bits of the base address are specified therein and extract the new part of the control data base address identified therein. The control data base address entry analyser 1614 may then update the stored current control data base address 1616 to reflect the new base address, or the new part of the base address. Then when the primitive block entry analyser determines that the current tile is valid for a primitive block corresponding to a primitive block entry the primitive block entry analyser 1606 may be configured to determine the address of the corresponding control data block in memory based on the data pointer portion of the primitive block entry and the current control data base address 1616.

The link entry analyser 1612 is configured to receive link entries from the entry type analyser 1610 and extract the address in memory of the next control stream block therefrom. The link entry analyser 1612 may then transmit the address of the next control stream block to the fetch module 1602 which may then retrieve the next control stream block from memory 1604 using the identified address.

In some cases, where each entry comprises valid tile information (e.g. as described above with respect to FIG. 7), the control stream decoder 1600 may further comprise a block skip module 1618 which is configured to determine from the valid tile information of each entry whether any of the primitive block entries in the group are relevant to the current tile. For example, as described above with respect to FIG. 7, where the valid tile information comprises a valid tile mask, the block skip module 1618 may be configured to select the bit of each valid tile mask that corresponds to the current tile, perform an OR operation on the selected bits, and determine whether any of the primitive block entries in the block or group are relevant to the current tile based on the outcome of the OR operation. If the block skip module 1618 determines that none of the primitive block entries in the block or group are relevant to the current tile then the block skip module 1618 may be configured to provide the control stream entries in the group or block to the entry type analyser 1610 along with a notification that none of the primitive block entries need to be passed to the primitive block analyser. If, however, the block skip module 1618 determines that at least one primitive block entry in the block or group is relevant to the current tile then the block skip module 1618 may be configured to provide the control stream entries in the group or block to the entry type analyser 1610 to be processed as normal. An example method which may be implemented by the block skip module 1618 is described below with respect to FIG. 19.

Figure 17:
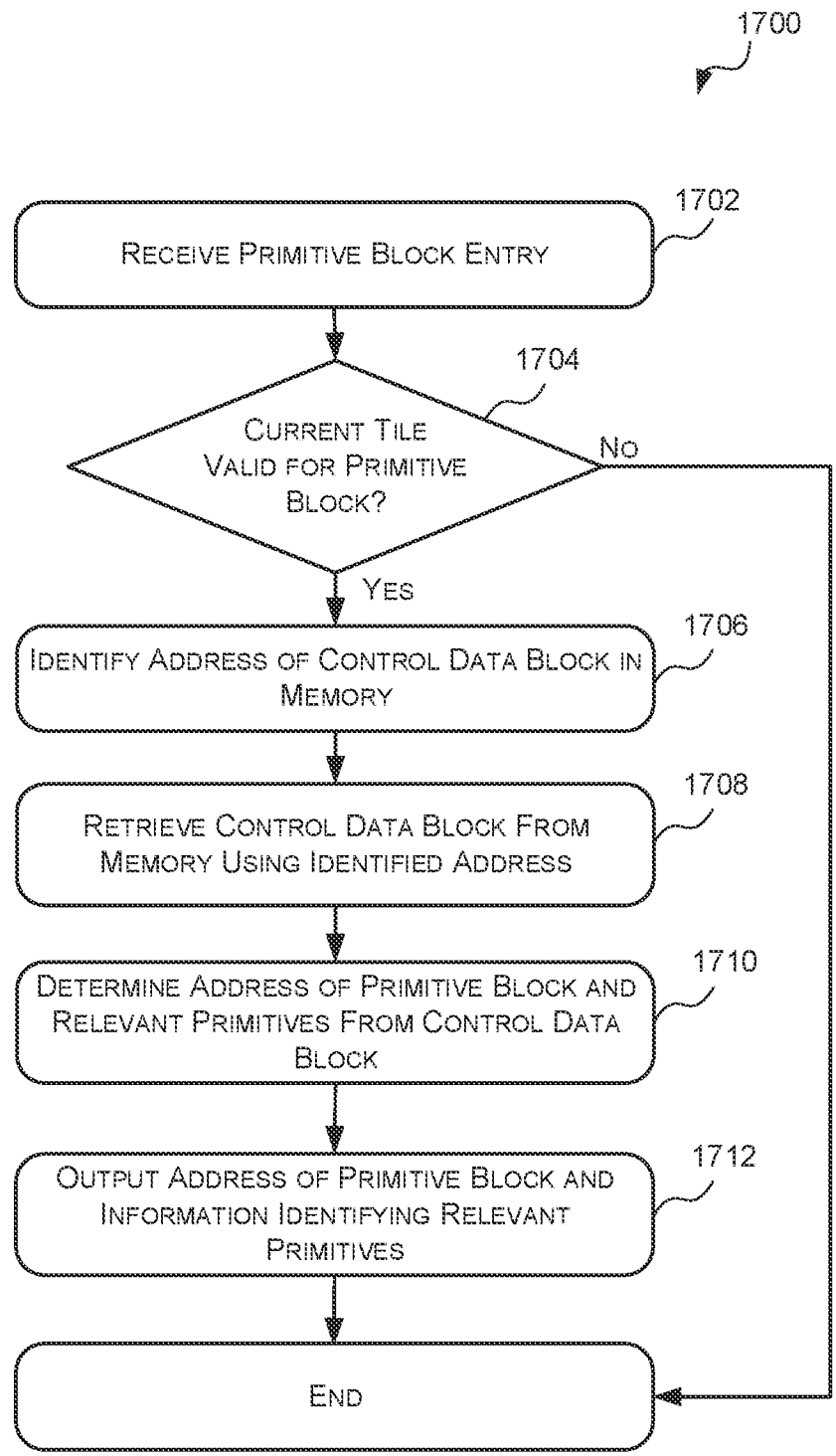
FIG. 17 is a flow diagram of an example method of processing a primitive block entry of a control stream.

Reference is now made to FIG. 17 which illustrates an example method 1700 for processing a primitive block entry which may be implemented by the control stream decoder 1600, and specifically the primitive block entry analyser 1606 thereof. The method 1700 begins at step 1702 where the control stream decoder (e.g. primitive block entry analyser 1606) receives a primitive block entry. At step 1704 the control stream decoder (e.g. primitive block entry analyser 1606) determines, from the valid tile information in the primitive block entry, whether the current tile is valid for the corresponding primitive block (i.e. whether there are any primitives in the corresponding primitive block that fall, at least partially, within the bounds of the current tile). For example, where the valid tile information comprises a valid tile mask this may comprise identifying the bit of the valid tile mask that corresponds to the current tile and determining from the identified bit whether the current tile is valid for the corresponding primitive block. If it is determined at step 1704 that the current tile is not valid for the corresponding primitive block, then the primitive block entry is not further processed, and the method ends. The method may then be repeated for the next primitive block entry. If, however, it is determined at step 1704 that the current tile is valid for the corresponding primitive block then the method 1700 proceeds to step 1706.

At step 1706, the control stream decoder 1600 (e.g. the primitive block entry analyser 1606) identifies, from the data pointer portion of the primitive block entry the address of the corresponding control data block in memory. In some cases the data pointer portion of a primitive block entry may specify the whole address. In these cases the address may be extract from the primitive block entry. However, in other cases, the data pointer portion of the primitive block entry may specify only an offset and the complete address is generated by combining the offset specified in the data pointer portion of the primitive block entry and the current base address. Once the address of the corresponding control data block in memory has been identified the method 1700 proceeds to step 1708 where the control stream decoder 1600 (e.g. the primitive block entry analyser 1606) retrieves the corresponding control data block from memory using the identified address. Once the control data block has been retrieved from memory the method 1700 proceeds to step 1710 where the control stream decoder determines, from the control data block, (i) the address of the corresponding primitive block and (ii) the primitives of that primitive block that are relevant to the current tile. Identifying the primitives of that primitive block that are relevant to the current tile may comprise reading the primitive mask corresponding to the current tile from the control data block or reading other information from the control data block. For example, as described above the control data block may comprise information indicating whether a tile in the tile group has a full valid mask. At step 1712 the control stream decoder 1600 (e.g. the primitive block entry analyser 1606) outputs the address of the primitive block in memory and information identifying the primitives of that primitive block that are relevant to the current tile. The method 1700 then ends.

Figure 18:
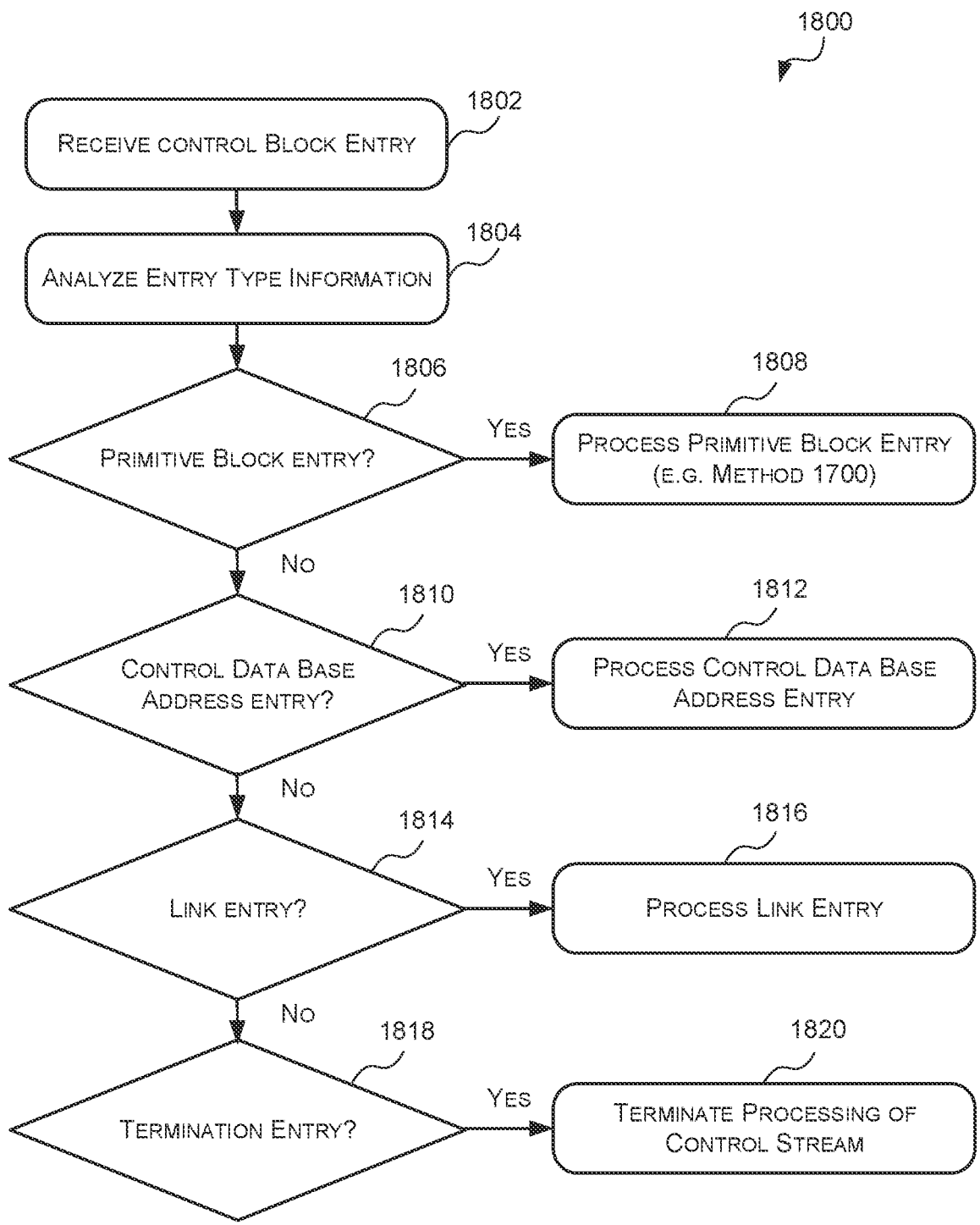
FIG. 18 is a flow diagram of an example method of processing an entry of a control stream.

Reference is now made to FIG. 18 which illustrates an example method 1800 for processing the entries of a control stream where there are multiple control stream entry types which may be implemented by the control stream decoder 1600, and specifically, the entry type analyser thereof. The method 1800 begins at step 1802 where the control stream decoder 1600 (e.g. entry type analyser 1610) receives a control stream entry. At step 1804 the control stream decoder 1600 (e.g. entry type analyser 1610) analyses the entry type information/bits of the control stream entry to identify the type of control stream entry. If the control stream decoder 1600 (e.g. entry type analyser 1610) determines (step 1806) that the control stream entry is a primitive block entry then at step 1808 the primitive block entry is processed to determine whether the current tile is valid for the corresponding primitive block and if so, retrieves the control data block for that primitive block from memory (e.g. method 1700 may be executed). If, however, the control stream decoder 1600 determines (step 1806) that the control stream entry is not a primitive block entry then the method 1800 proceeds to 1810. If the control stream decoder 1600 (e.g. entry type analyser 1610) determines (step 1810) that the control stream entry is a control data base address entry then the method 1800 proceeds to step 1812 where the new control data base address or the new portion of the control data base address is extracted therefrom and the current base address is updated to reflect the new base address or the new portion thereof. If the control stream decoder 1600 (at step 1810) determines that the control stream entry is not a control data base address entry, then the method 1800 proceeds to 1814. If the control stream decoder 1600 (e.g. entry type analyser 1610) determines (step 1814) that the control stream entry is a link entry then the method 1800 proceeds to step 1816 where the address of the next control stream block is extracted therefrom and the next control stream block is retrieved from the identified address. If the control stream decoder 1600 determines (step 1814) that the control stream entry is not a link entry, then the method 1800 proceeds to 1818. If the control stream decoder 1600 (e.g. entry type analyser 1610) determines (step 1818) that the control stream entry is a termination entry then the end of the control stream has been reached and the method 1800 proceeds to step 1820 where the control stream decoder 1600 terminates processing of the control stream.

Although FIG. 18 shows the steps 1806, 1810, 1814 and 1818 in a specific order it will be evident to a person of skill in the art that the steps 1806, 1810, 1814 and 1818 may be performed in any order.

Figure 19:
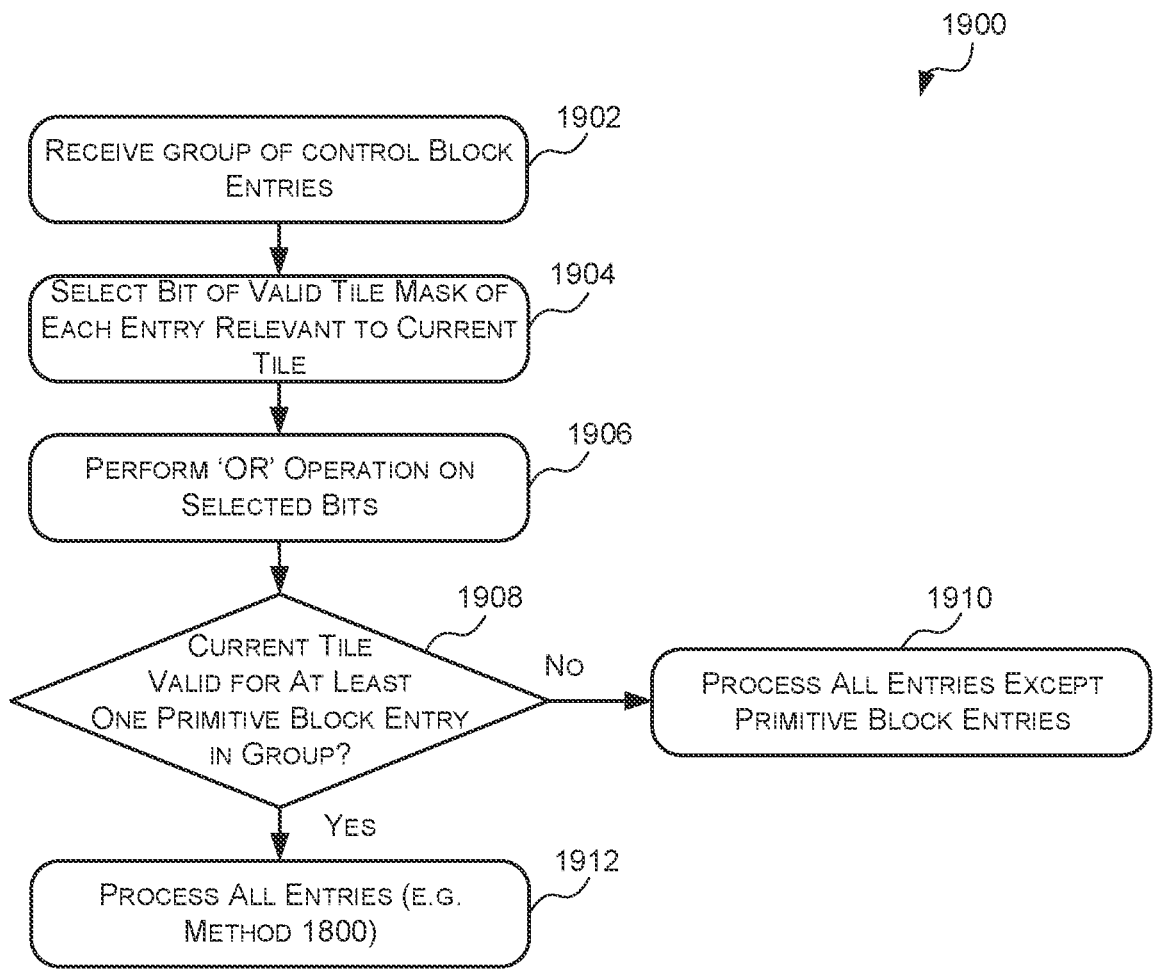
FIG. 19 is a flow diagram of an example method of determining whether a group of entries can be skipped for a tile.

Reference is now made to FIG. 19 which illustrates an example method 1900 of skipping a group or block of control stream entries wherein each control stream entry comprises valid tile information and the valid tile information of any non-primitive block entry indicates that none of the tiles in the tile group are valid. The method 1900 may be implemented by the control stream decoder 1600, and specifically the block skip module 1618 thereof. The method 1900 begins at step 1902 where the control stream decoder 1600 (e.g. block skip module 1618) receives a group or block of control stream entries. Where the control stream entries are divided into control stream blocks the group of entries may form a control stream block. At step 1904, the control stream decoder 1600 (e.g. block skip module 1618) may select the portion (e.g. bits) of the valid tile information of each entry that pertains to the current tile. In some cases, the valid tile information may comprise a valid tile mask that comprises a bit for each tile that indicates whether or not that tile is valid for the corresponding primitive block. For example, as described above with respect to FIG. 7 if the tile group comprises four tiles the valid tile mask comprises a bit for each tile wherein the first bit corresponds to the first tile, the second bit corresponds to the second tile, the third bit corresponds to the third tile and the fourth bit corresponds to the fourth tile. In this example, if the current tile is the first tile in the group then the control stream decoder 1600 (e.g. block skip module 1618) may select the first bit of the valid tile mask of each of the control stream entries.

Then at step 1906 the control stream decoder 1600 (e.g. block skip module 1618) may perform an operation on, or combine, the selected bits to determine whether the current tile is valid for any primitive block entries in the group. For example, as described above, the control stream decoder 1600 (e.g. block skip module 1618) may perform an OR operation on the selected bits (e.g. may OR all of the selected bits together) to determine whether the current tile is valid for any primitive block entries in the group. Then at step 1908 it is determined from the result of the operation, or combination, whether the current tile is valid for any of the primitive block entries in the group. If it is determined at step 1908 that the current tile is not valid for any of the primitive block entries in the group, then the method 1900 proceeds to step 1910 where all of the entries in the group except the primitive block entries are processed. This may comprise executing or implementing a modified version of the method 1800 of FIG. 18 for each entry where instead of executing step 1808 for a primitive block entry, the method 1800 simply ends. If, however, it is determined at step 1908 that the current tile is valid for at least one primitive block entry in the group then the method 1900 proceeds to step 1912 where all of the entries in the group are processed. This may comprise, for example, executing the method 1800 of FIG. 18 for each control stream entry in the group.

Graphics Processing System

Figure 20:
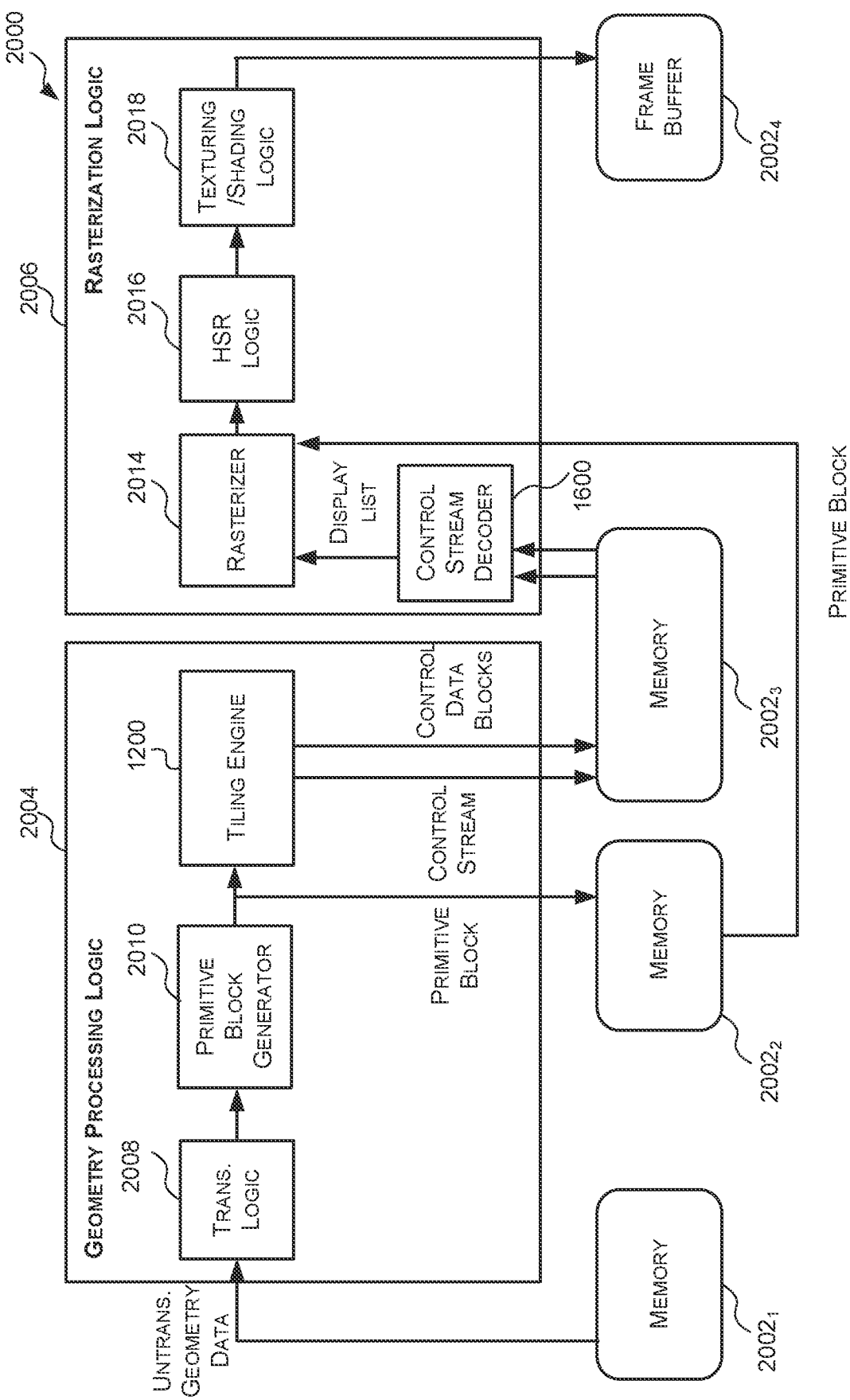
FIG. 20 is a block diagram of an example tile-based rendering graphics processing system that comprises the tiling engine of FIG. 12 and the control stream decoder of FIG. 16.

Reference is now made to FIG. 20 which illustrates an example tile-based graphics processing system 2000 which comprises the tiling engine 1200 of FIG. 12 and the control stream decoder 1600 of FIG. 16. The graphics processing system 2000 of FIG. 20 is similar to the graphics processing system 100 of FIG. 1 in that it comprises geometry processing logic 2004 and rasterization logic 2006; the geometry processing logic 2004 comprises transformation logic 2008 and a primitive block generator 2010 (each of which function as the corresponding components of FIG. 1); and the rasterization logic 2006 comprises a rasterizer 2014, HSR logic 2016 and texturing/shading logic 2018 (each of which function as the corresponding components of FIG. 1 described above). However, instead of the geometry processing logic comprising a tiling engine that is configured to store a display list per tile, the geometry processing logic 2004 comprises a tiling engine 1200 configured to group the tiles into tile groups and store, for each tile group, a control structure that comprises a control stream and one or more control data blocks that are linked to the control stream as described above. The rasterization logic 2006 of FIG. 20 also comprises a control stream decoder 1600 which is configured to generate a display list for each tile by decoding the corresponding control stream stored in memory 2002.

Test Results

Figure 2:
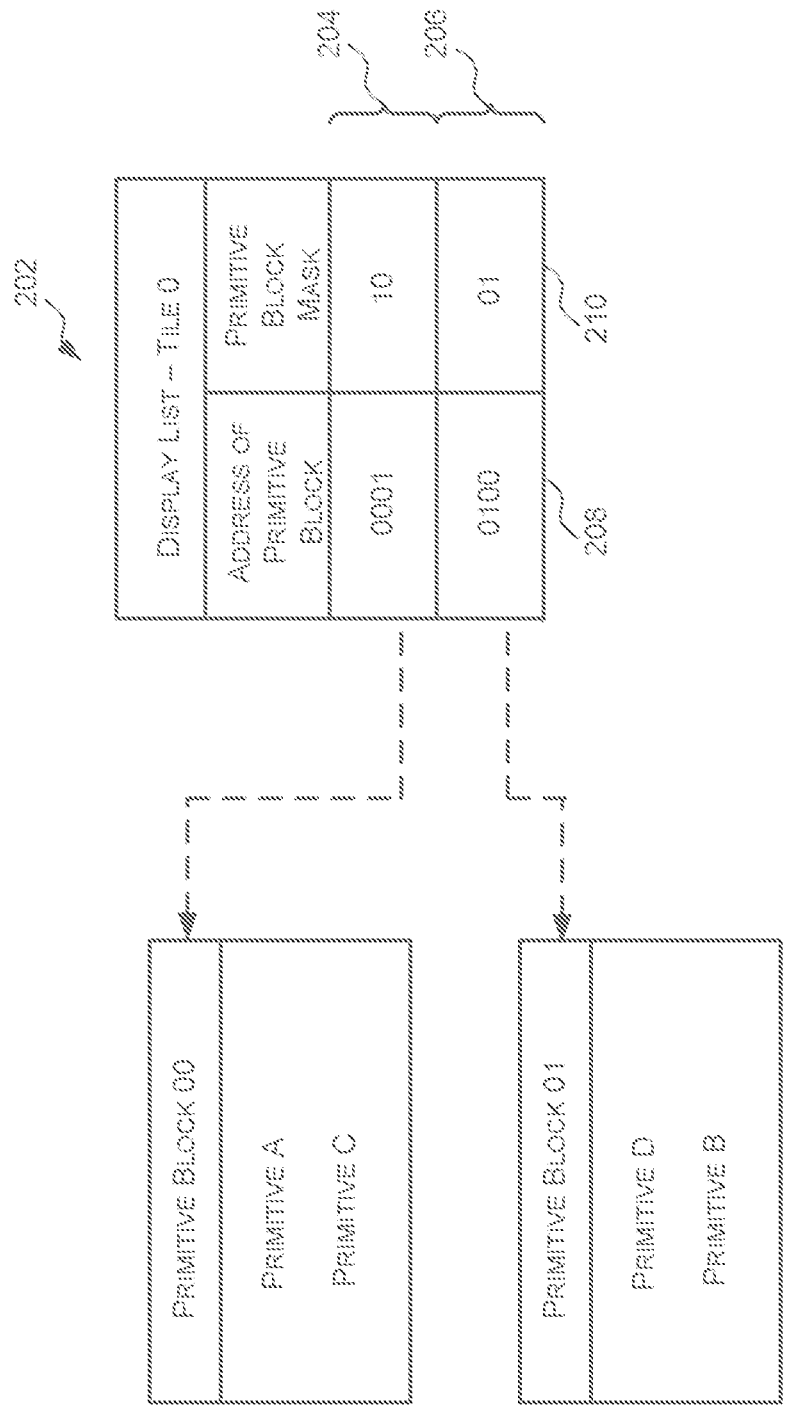
FIG. 2 is a schematic diagram of an example display list.
Figure 21:
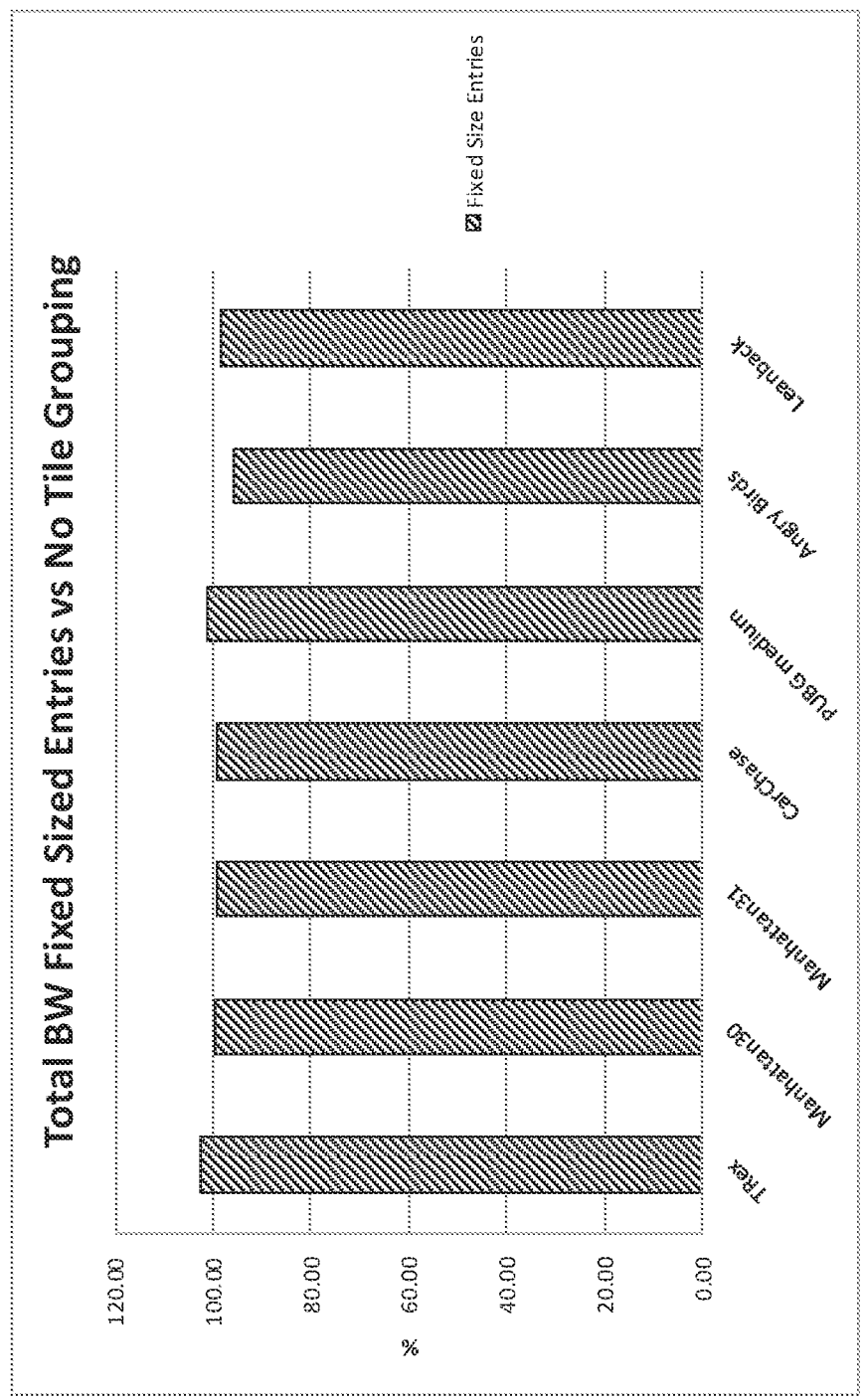
FIG. 21 is a graph illustrating the total bandwidth when storing tiling data in the manner described herein as a percentage of the total bandwidth when storing a separate display list per tile for a number of benchmarks.

Testing has shown that in most cases storing the variable length control data separate from the control stream reduces the total bandwidth to read and write the tiling data compared to storing a display list per tile (e.g. as described above with respect to FIG. 2). For example, FIG. 21 shows the bandwidth to store a control stream for a group of tiles where the variable control data blocks are stored separately therefrom as a percentage of the bandwidth to store a display list per tile for number of graphics benchmarks. It can be seen that only for the TRex and PUBG benchmarks the total bandwidth is increased and even in these cases the increase is minimal. This increase is due to the two tiered control stream wherein a control stream decoder has to read the control stream and, if necessary, read the control data block.

Figure 22:
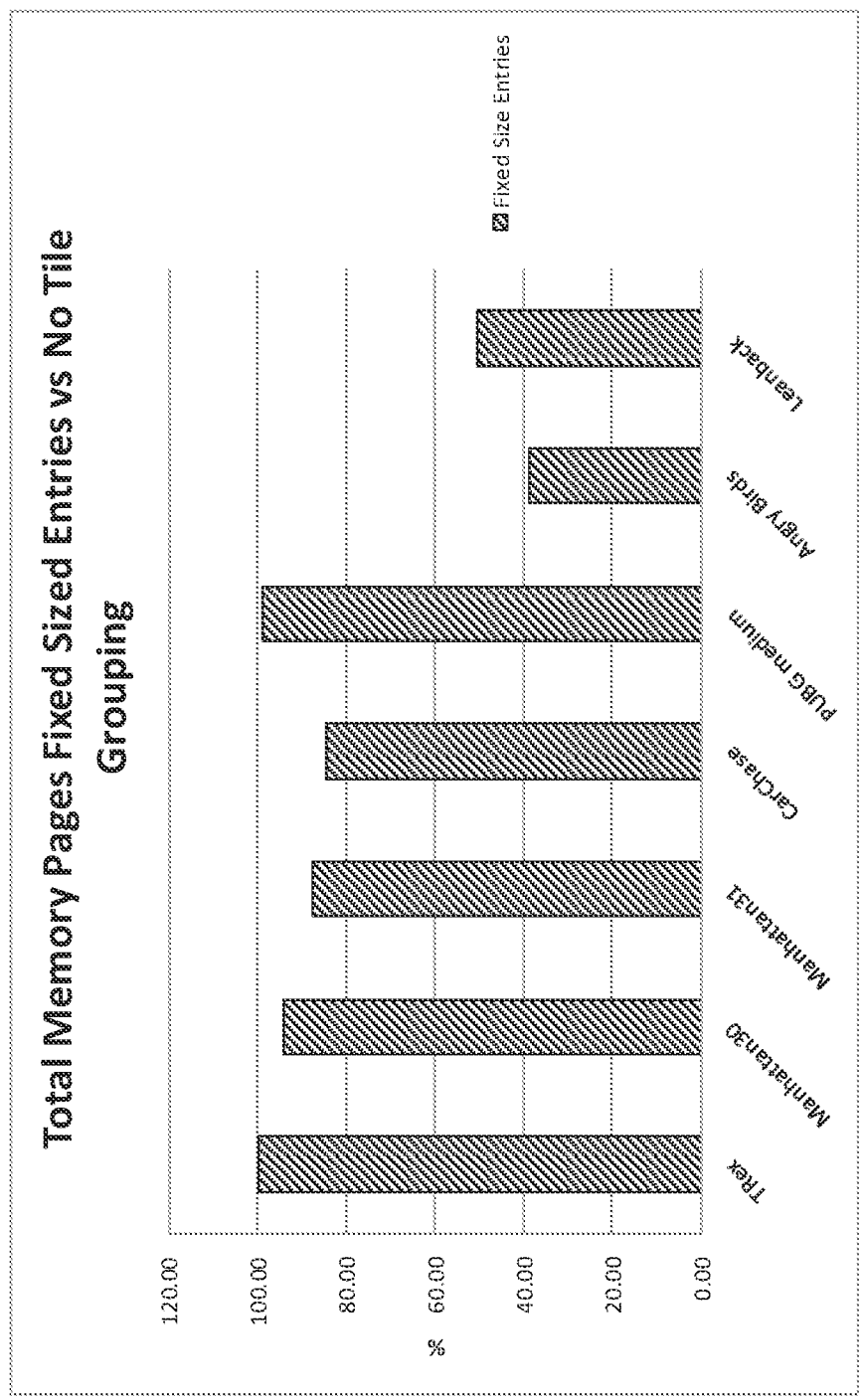
FIG. 22 is a graph illustrating the total number of pages to store the tiling data in the manner described herein as a percentage of the total number of pages to store a separate display list per tile for a number of benchmarks.

Testing has shown that in most cases storing the variable length control data separate from the control stream reduces the amount of memory used to store the tiling data compared to storing a display list per tile (e.g. as described above with respect to FIG. 2) because it allows the control stream itself to be packed in memory more efficiently. The only memory wastage occurs when the control stream is stored in control stream blocks as a whole memory page may be allocated to a control stream block, but the whole page may not be used (e.g. because there are not enough entries to fill the page). For example, FIG. 22 shows the total pages to store the tiling data when the variable length control data is stored separately from the control stream as a percentage of the total pages to store a display list per tile. It can be seen from FIG. 22 that storing the tiling data as described herein (e.g. storing a control stream for each group of tiles wherein the variable length control data is stored separately from the control stream) reduced the total number of pages to store the tiling data, and in some cases, such as Angry Birds, quite significantly (i.e. more than 50%).

Figure 23:
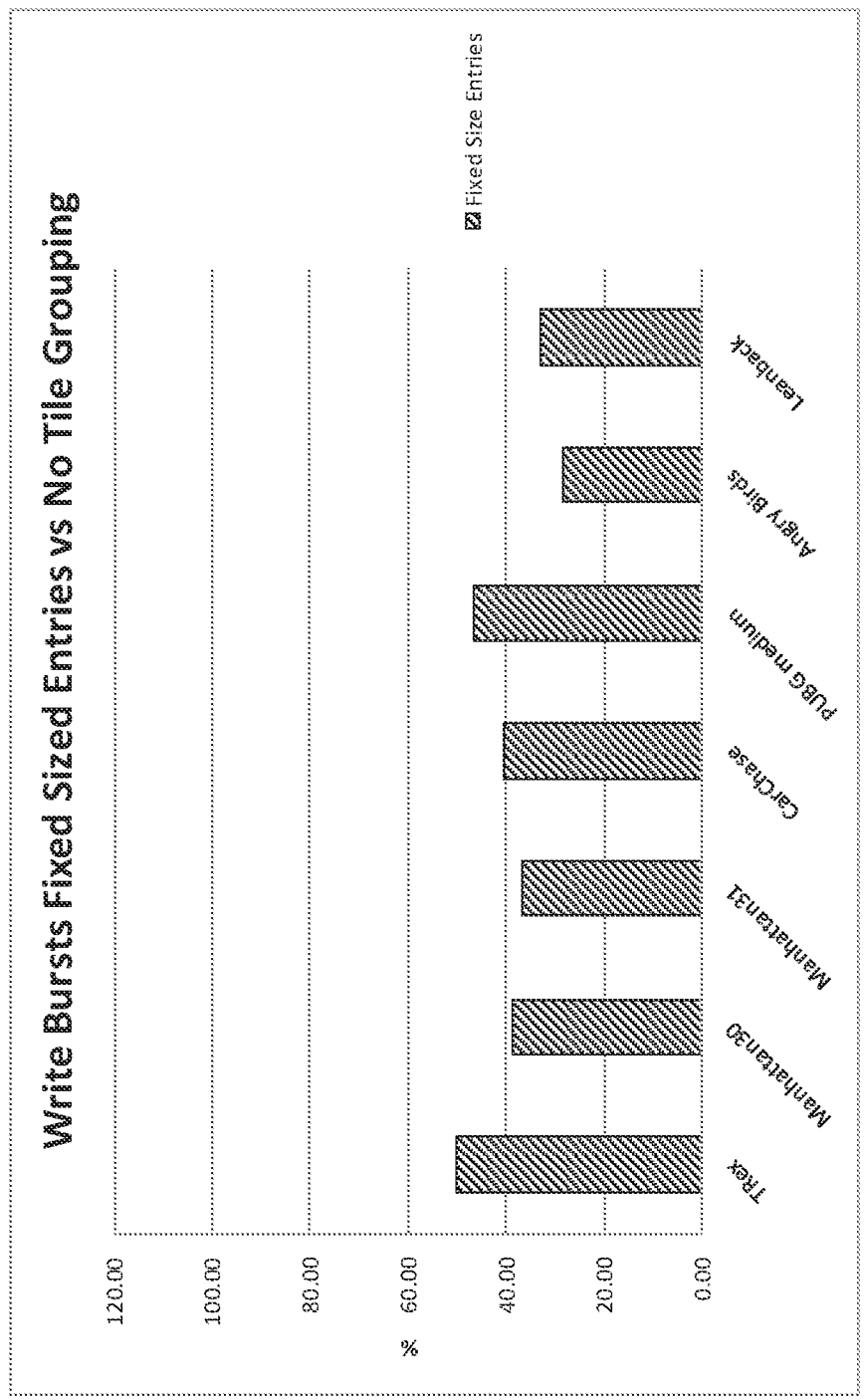
FIG. 23 is a graph illustrating the total tiling engine bursts to store the tiling data in the manner described herein as a percentage of the tiling engine bursts to store a separate display list per tile for a number of benchmarks.
Figure 24:
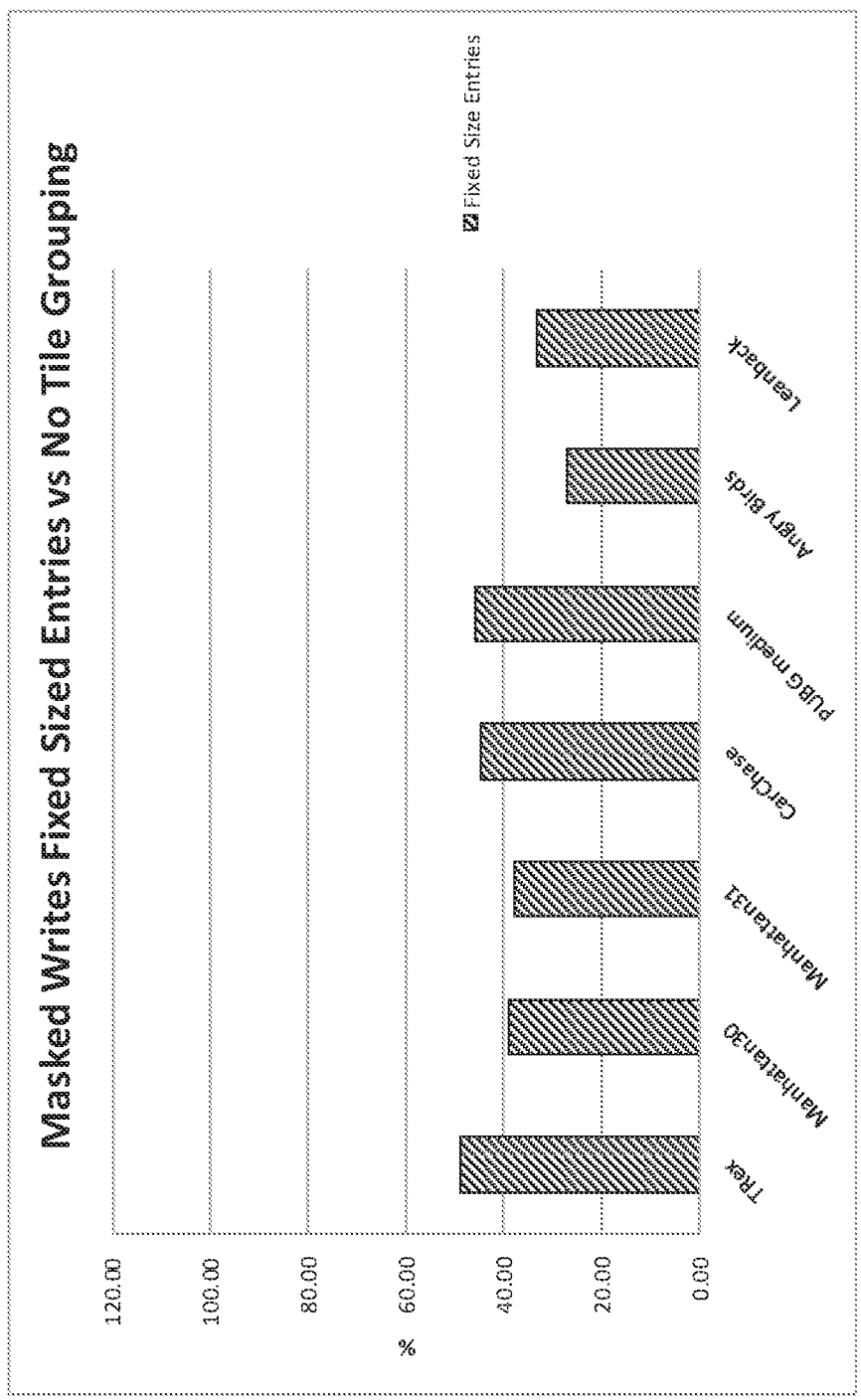
FIG. 24 is a graph illustrating the total tiling engine masked writes to store the tiling data in the manner described herein as a percentage of the tiling engine masked writes to store a separate display list per tile for a number of benchmarks.

Testing has also shown that the number of masked writes by the tiling engine and the number of bursts produced by the tiling engine are reduced when storing the tiling data as described herein (e.g. storing a control stream for each group of tiles wherein the variable length control data is stored separately from the control stream) compared to storing a display list per tile (e.g. as described above with respect to FIG. 2). Specifically, FIG. 23 shows the number of bursts produced by the tiling engine when the tiling data is stored as described herein as a percentage of the number of bursts produced by the tiling engine when a display list is stored per tile; and FIG. 24 shows the number of masked writes performed for the tiling engine when tiling data is stored as described herein as a percentage of the number of masked writes by the tiling engine when a display list is stored per tile for a number of graphics benchmarks. As is known to those of skill in the art, some memories may be configured such that data may only be written to the memory in burst-sized chunks, or memory interface width chunks (e.g. 32 bytes at a time). It may, however, be desirable to write to only a portion of a burst-sized chunk. In these cases, the portion of a burst-sized chunk that is to be written to may be identified by a mask. This is referred to as a masked write.

Figure 25:
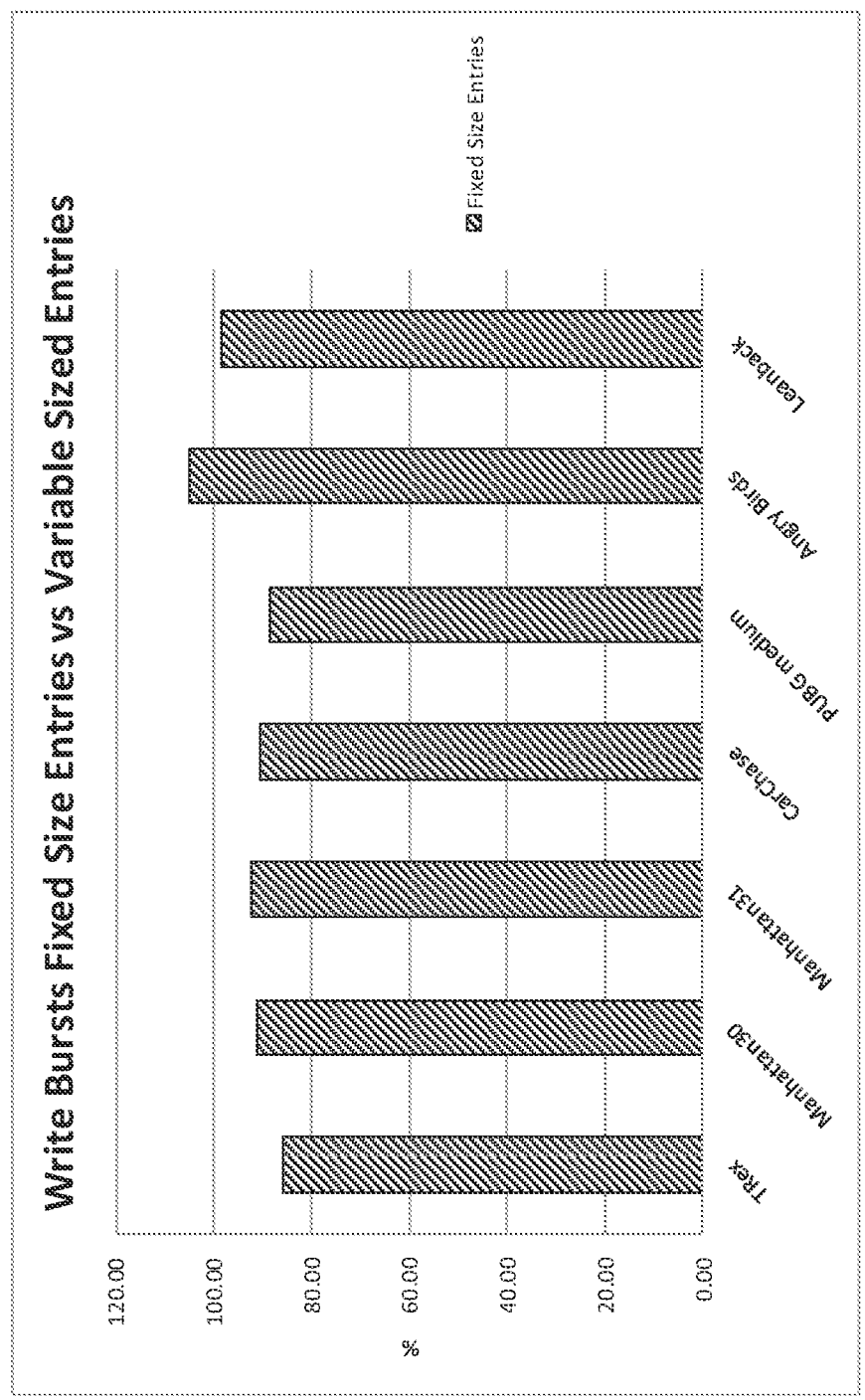
FIG. 25 is a graph illustrating the total tiling engine bursts to store the tiling data in the manner described herein as a percentage of the tiling engine bursts to store a display list per tile group wherein the variable length control data is stored as part of the control stream for a number of benchmarks.

Testing has also shown that the number of bursts produced by the tiling engine are reduced when storing the tiling data as described herein (e.g. storing a control stream for each group of tiles wherein the variable length control data is stored separately from the control stream) compared to storing a control stream per tile group wherein the variable length control data is stored as part of the control stream (e.g. as described above with respect to FIG. 3). FIG. 25 shows the number of bursts produced by the tiling engine when the tiling data is stored as described herein as a percentage of the number of bursts produced by the tiling engine when a display list is stored per tile group wherein the variable length control data is stored as part of the control stream (e.g. as described above with respect to FIG. 3).

Figure 26:
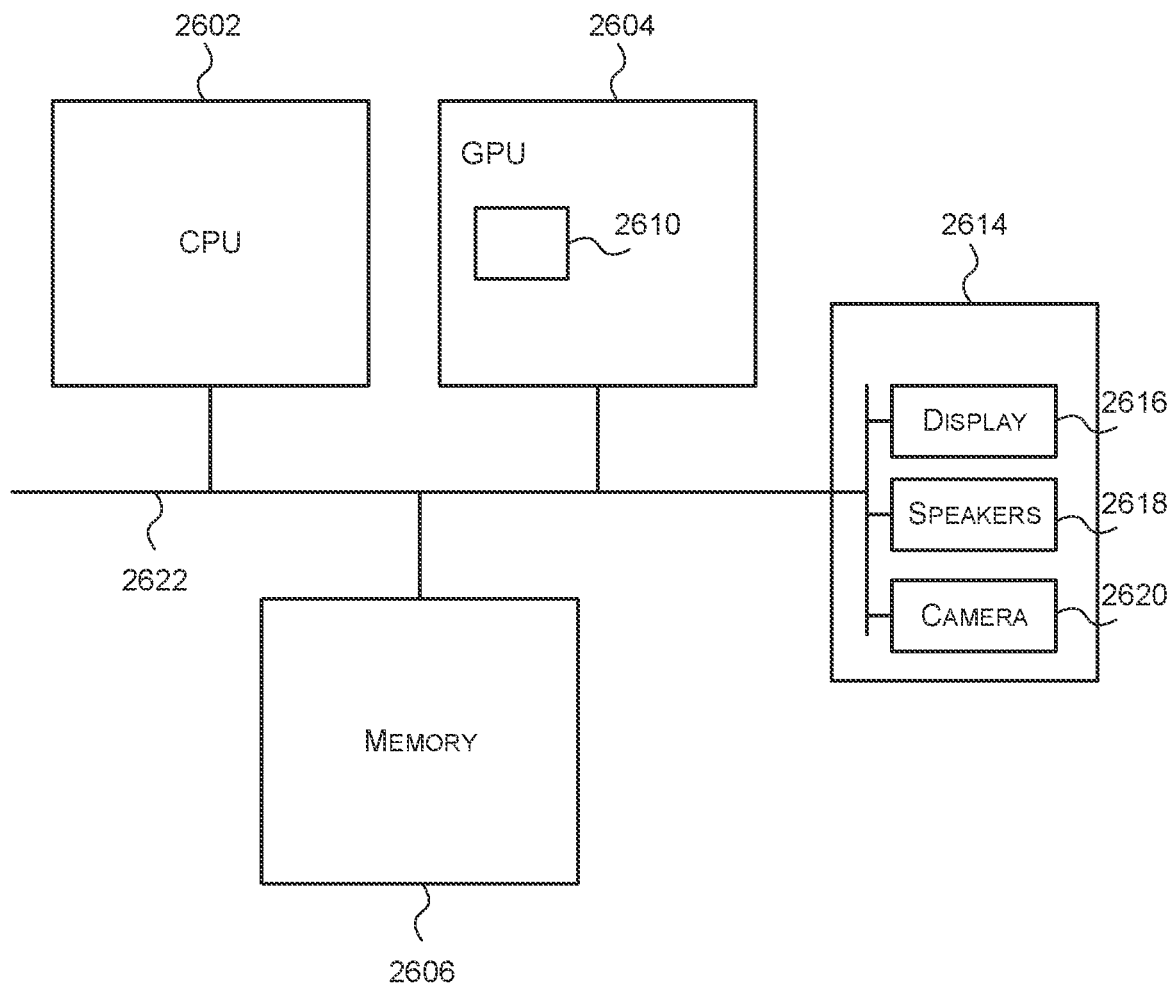
FIG. 26 is a block diagram of an example computer system in which the tiling engines, control stream decoders and/or the graphics processing systems described herein may be implemented.

FIG. 26 shows a computer system in which the tiling engines, control stream decoders and/or graphics processing systems described herein may be implemented. The computer system comprises a CPU 2602, a GPU 2604, a memory 2606 and other devices 2614, such as a display 2616, speakers 2618 and a camera 2620. A processing block 2610 (which may correspond to a tiling engine, a control stream decoder and/or graphics processing system described herein) is implemented on the GPU 2604. In other examples, the processing block 2610 may be implemented on the CPU 2602. The components of the computer system can communicate with each other via a communications bus 2622.

The tiling engines, control stream decoders, and graphics processing systems of FIGS. 1, 12 and 16 are shown as comprising a number of functional blocks. This is schematic only and is not intended to define a strict division between different logic elements of such entities. Each functional block may be provided in any suitable manner. It is to be understood that intermediate values described herein as being formed by the tiling engine, the control stream decoder or the graphics processing system, need not be physically generated by the tiling engine, the control stream decoder or the graphics processing system at any point and may merely represent logical values which conveniently describe the processing performed by the tiling engine, the control stream decoder or graphics processing system between its input and output.

The tiling engines, control stream decoders and graphics processing systems described herein may be embodied in hardware on an integrated circuit. The tiling engines, control stream decoders and graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a tiling engine, a control stream decoder or graphics processing system configured to perform any of the methods described herein, or to manufacture a tiling engine, a control stream decoder or graphics processing systems comprising any apparatus described herein. An integrated circuit definition dataset may be, for example, an integrated circuit description.

Therefore, there may be provided a method of manufacturing, at an integrated circuit manufacturing system, a tiling engine, a control stream decoder or a graphics processing system as described herein. Furthermore, there may be provided an integrated circuit definition dataset that, when processed in an integrated circuit manufacturing system, causes the method of manufacturing a tiling engine, a control stream decoder or a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a tiling engine, a control stream decoder or a graphics processing system will now be described with respect to FIG. 27.

Figure 27:
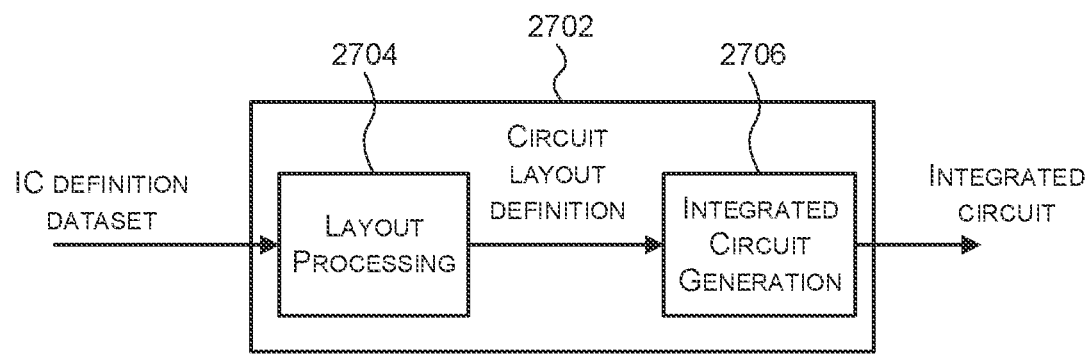
FIG. 27 is a block diagram of an example integrated circuit manufacturing system for generating an integrated circuit embodying the tiling engines, the control stream decoders and/or the graphics processing systems described herein.

FIG. 27 shows an example of an integrated circuit (IC) manufacturing system 2702 which is configured to manufacture a tiling engine, a control stream decoder or a graphics processing system as described in any of the examples herein. In particular, the IC manufacturing system 2702 comprises a layout processing system 2704 and an integrated circuit generation system 2706. The IC manufacturing system 2702 is configured to receive an IC definition dataset (e.g. defining a tiling engine, a control stream decoder or a graphics processing system as described in any of the examples herein), process the IC definition dataset, and generate an IC according to the IC definition dataset (e.g. which embodies a tiling engine, a control stream decoder or a graphics processing system as described in any of the examples herein). The processing of the IC definition dataset configures the IC manufacturing system 2702 to manufacture an integrated circuit embodying a tiling engine, a control stream decoder or a graphics processing system as described in any of the examples herein.

The layout processing system 2704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2704 has determined the circuit layout it may output a circuit layout definition to the IC generation system 2706. A circuit layout definition may be, for example, a circuit layout description.

The IC generation system 2706 generates an IC according to the circuit layout definition, as is known in the art. For example, the IC generation system 2706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2706 may be in the form of computer-readable code which the IC generation system 2706 can use to form a suitable mask for use in generating an IC.

The different processes performed by the IC manufacturing system 2702 may be implemented all in one location, e.g. by one party. Alternatively, the IC manufacturing system 2702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tiling engine, a control stream decoder or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 27 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 27, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A control stream decoder for decoding a control stream for a tile group comprising at least two tiles of a rendering space, the control stream decoder comprising:
   a fetch module configured to fetch the control stream for the tile group from memory, the control stream comprising one or more fixed length primitive block entries, each primitive block entry identifying a location in memory of a control data block for a corresponding primitive block; and
   a primitive block entry analyser configured to receive at least one of the one or more primitive block entries, and for each received primitive block entry:
   (a) determine whether a current tile of the tile group is a valid tile for the corresponding primitive block, a tile being a valid tile for a primitive block if at least one primitive in the primitive block intersects that tile,
   (b) in response to determining that the current tile is a valid tile for the corresponding primitive block, retrieve the control data block for the corresponding primitive block from the identified location in memory,
   (c) identify, from the retrieved control data block, an address of the corresponding primitive block in memory and primitives of that primitive block relevant for rendering the current tile, and
   (d) output information identifying the address of the corresponding primitive block in memory and the primitives of that primitive block relevant for rendering the current tile.

2. The control stream decoder of claim 1, wherein each primitive block entry comprises valid tile information identifying which tiles of the tile group are valid tiles for the corresponding primitive block.

3. The control stream decoder of claim 2, wherein the valid tile information comprises a valid tile mask which comprises a bit for each tile in the tile group which indicates whether that tile is a valid tile for the corresponding primitive block.

4. The control stream decoder of claim 2, wherein the primitive block entry analyser is configured to determine whether the current tile of the tile group is a valid tile for the corresponding primitive block from the valid tile information of the primitive block entry.

5. The control stream decoder of claim 2, further comprising:
   a block skip module configured to, for each of one or more groups of entries of the control stream:
   select a portion of the valid tile information for each entry of the group of entries corresponding to the current tile, and perform an operation on the selected portions to determine whether the current tile is a valid tile for any primitive block corresponding to a primitive block entry in the group of entries;

wherein the primitive block entry analyser only receives primitive block entries in a group of entries of the one or more groups of entries if a result of the operation for that group of entries indicates that the current tile is a valid tile for at least one primitive block corresponding to a primitive block entry in the group of entries.

6. The control stream decoder of claim 5, wherein:
the valid tile information for each entry comprises a valid tile mask with a bit for each tile of the tile group;
the selected portion of the valid tile information for each entry is the bit of the valid tile mask that corresponds to the current tile; and
the operation that is performed on the selected portions is an OR operation.

7. The control stream decoder of claim 5, wherein the control stream comprises one or more other types of entries and each of the one or more other types of entries comprises valid tile information that indicates that none of the tiles of the tile group are valid tiles.

8. The control stream decoder of claim 1, wherein the control stream comprises one or more other types of entries, and the control stream decoder further comprises an entry type analyser configured to: receive one or more entries of the control stream, determine a type of each of the one or more received entries, and in response to determining that a received entry is a primitive block entry, forward the primitive block entry to the primitive block entry analyser.

9. The control stream decoder of claim 8, wherein each entry of the control stream comprises one or more entry type bits and the entry type analyser is configured to determine the type of each entry based on the one or more entry type bits of that entry.

10. The control stream decoder of claim 8, wherein:
the control stream is stored in memory in a plurality of control stream blocks, and a last entry in each control stream block, other than the last control stream block, is a link entry which identifies a location of a next control stream block in memory;
the control stream decoder further comprises a link entry analyser configured to receive one or more link entries and, for each received link entry, extract the location in memory of the next control stream block from that link entry and provide the extracted location to the fetch module; and
the entry type analyser is configured to, in response to determining that a received entry is a link entry, forward the link entry to the link entry analyser.

11. The control stream decoder of claim 8, wherein:
each primitive block entry comprises a data pointer that identifies the location in memory of the control data block for the corresponding primitive block;
the control stream comprises at least one control data base address entry which specifies at least a portion of a control data base address;
the control stream decoder further comprises a control data base address entry analyser configured to receive one or more control data base address entries and, for each received control data base address entry, extract at least a portion of a control data base address from that control data base address entry, and update a current control data base address based on the extracted at least a portion of the control data base address;
the primitive block entry analyser is configured to generate an address of a control data block in memory from a combination of the current control data base address and the data pointer of the primitive block entry; and
the entry type analyser is configured to, in response to determining that a received entry is a control data base address entry, forward the control data base address entry to the control data base address entry analyser.

12. The control stream decoder of claim 11, wherein each data pointer comprises an offset into a portion of the memory identified by the current control data base address.

13. The control stream decoder of claim 11, wherein each control data base address entry specifies a complete control data base address.

14. The control stream decoder of claim 11, wherein each control data base address entry specifies only a portion of a complete control data base address.

15. The control stream decoder of claim 8, wherein:
the control stream further comprises a termination entry which identifies an end of the control stream, the termination entry being a last entry in the control stream, and
the entry type analyser is configured to, in response to determining that a received entry is a termination entry, determine an end of the control stream has been reached.

16. The control stream decoder of claim 1, wherein each control data block comprises information identifying which primitives of the corresponding primitive block intersect each tile of the tile group and the primitive block entry analyser is configured to identify, from the information identifying which primitives in the corresponding primitive block intersect each tile of the tile group, the primitives of that primitive block relevant for rendering the current tile.

17. The control stream decoder of claim 1, wherein each control data block comprises information identifying an address of the corresponding primitive block in memory and the primitive block entry analyser is configured to identify, from the information identifying an address of the corresponding primitive bock in memory, an address of the primitive block in memory.

18. The control stream decoder of claim 1, wherein the control stream decoder is embodied in hardware on an integrated circuit.

19. A graphics processing system comprising the control stream decoder as set forth in claim 1.

20. A non-transitory computer readable storage medium having stored thereon a computer readable dataset description of the control stream decoder as set forth in claim 1, which when processed in an integrated circuit manufacturing system, causes the integrated circuit manufacturing system to manufacture an integrated circuit embodying the control stream decoder.

* * * * *